US006223535B1

(12) United States Patent
Kitz

(10) Patent No.: US 6,223,535 B1
(45) Date of Patent: May 1, 2001

(54) GEOTHERMAL STEAM PROCESSING

(75) Inventor: Kevin R. Kitz, Metro Manila (PH)

(73) Assignee: Union Oil Company of California, El Segundo, CA (US)

( * ) Notice: Subject to any disclaimer, the term of this patent is extended or adjusted under 35 U.S.C. 154(b) by 0 days.

(21) Appl. No.: 09/178,211

(22) Filed: Oct. 23, 1998

(51) Int. Cl.[7] ............................................. F03G 7/00
(52) U.S. Cl. ............................................. 60/641.2; 60/649
(58) Field of Search ............................... 60/641.2, 641.1, 60/649, 698, 671

(56) References Cited

U.S. PATENT DOCUMENTS

| | | | |
|---|---|---|---|
| 4,011,303 | 3/1977 | MacGregor | 423/461 |
| 4,366,675 | 1/1983 | Nishioka . | |
| 4,596,698 | * 6/1986 | Spevack | 60/641.2 X |
| 4,767,263 | 8/1988 | Ayano et al. . | |
| 4,967,559 | * 11/1990 | Johnston | 60/641.2 |
| 4,996,846 | * 3/1991 | Bronicki | 60/641.2 |
| 5,364,439 | 11/1994 | Gallup . | |
| 5,502,984 | 4/1996 | Boehde et al. | 62/470 |
| 5,622,632 | 4/1997 | Gallup . | |
| 5,665,242 | * 9/1997 | Gallup | 60/641.2 X |
| 5,671,601 | * 9/1997 | Bronicki et al. | 60/641.2 X |

FOREIGN PATENT DOCUMENTS

| | | |
|---|---|---|
| WO9322032 | 11/1993 | (WO) . |
| WO9842434 | 10/1998 | (WO) . |

OTHER PUBLICATIONS

Patent Abstract of Japan vol. 004, No. 080 (M–015), Jun. 10, 1980 & JP 55 040237 A (Toshiba Corp), Mar. 21, 1980.
*The Water Encyclopedia,* Second Editin, by Van der Leeden et al., Lewis Publishers, Inc. (1990), title page and pp. 417–477.
"An Update of the Federal Drinking Water Regs" by Pontius, *Journal AWWA,* Feb., 1995, pp. 48–51 & 54–57.
NPCC Rules and Regulations, *Official Gazette,* vol. 74, No. 23, pp. 4467–4476 (Jun. 5, 1978).
Ministry, Bureau and Office Administrative Orders and Regulations, *Official Gazette,* vol. 78, No. 1, pp. 52–54 (Jan. 4, 1982).
DENR Administrative Order No. 35, Department of Environment and Natural Resources, Environmental Management Bureau (Philippines), title page & pp. 1–15 (Mar. 20, 1990).
"Direct–Contact Condensers for Geothermal Applications" by Bharathan, NREL/PG&E CRADA Progress Review, National Renewable Energy Laboratory, Golden, Colorado (Nov. 30–Dec. 2, 1994).
"Direct–Contact Condenser Applications" by Bharathan, National Renewable Energy Laboratory, in U.S. Department of Energy *Geotherman Program Review XII,* San Francisco, Calif., pp. 127–130 (Apr. 25–28, 1994).
"Power from the Earth Geothermal Development in New Zealand" published by ECNZ Geothermal Group, Wairakei, New Zealand, pp. 1, 25, 26, 30, 31, and 32.
"Geysers Advanced Direct Contact Condenser Research" by Henderson et al., in *Proceedings Geothermal Program Review XV* San Francisco DOE/EE–0139, pp. 3–3 to 3–9 (Mar. 24–26, 1997).

\* cited by examiner

*Primary Examiner*—Hoang Nguyen
(74) *Attorney, Agent, or Firm*—Gregory F. Wirzbicki

(57) ABSTRACT

As geothermal steam containing contaminants such as boron, arsenic, and mercury is passed through a turbine-condenser system, the contaminants preferentially collect in the initial condensate produced from the steam. Collecting this initially-produced condensate and segregating it from the remainder of the steam being condensed ensures that condensate produced from the remainder of the steam is contaminants-lean, preferably containing the contaminants in concentrations allowing for discharge of the contaminants-lean condensate to the environment.

124 Claims, 7 Drawing Sheets

GEOTHERMAL STEAM PROCESSING

BACKGROUND

Geothermal brine and steam reservoirs exist in many areas of the world and are a valuable energy resource. Some steam reservoirs yield a superheated steam which, after treatment to remove contaminants, can Ad be used to power a turbine connected to an electrical generator. More usually, the reservoir yields a geothermal brine which must be flashed to produce steam to power the turbine. After powering the turbine, the exhausted steam is condensed in either a direct contact condenser or a surface condenser (e.g., a shell-and-tube-condenser) to produce steam condensate. The steam condensate is then, in the vast majority of cases, used as liquid water make-up to a cooling tower which provides the working fluid (i.e., the cooling medium) for condensing steam in the condenser.

Cooling in the cooling tower is accomplished by evaporation, which produces, as a side effect, the concentration of salts, minerals, and chemicals in the non-evaporated water. If a direct contact condenser is used, as is the case with most geothermal power plants, the cycles of concentration in the cooling tower are normally not controlled. If a surface condenser is used, such as a tube-and-shell condenser, the cooling tower is usually operated to control the concentration of salts by maintaining the cycles of concentration within predetermined limits. This is accomplished by controlling the cooling tower blow down, i.e., controlling the rate at which liquid water is discharged from the cooling tower system.

Depending upon the location of the geothermal power plant, the percentage of total condensate produced in the turbine-condenser system which eventually is evaporated or discharged as cooling tower blowdown is between about 70 and 95%, leaving about 5 to 30% of excess condensate for disposal, e.g., discharge to the environment (i.e., by distribution upon a natural earth surface or by discharge to a water body, such as a lake, creek, river, or ocean). Ideally, where possible, the environmental discharge can also serve a beneficial purpose, e.g., agricultural irrigation. Alternatively, the excess condensate can be used for other beneficial purposes, e.g., industrial water. Alternatively again, the excess condensate can be re-injected into the geothermal resource formation, and in many cases this is desired to maintain the resource pressure and volume. However, in other cases, it is not desired, but becomes a necessity because the condensate contains one or more components in excess of applicable environmental discharge regulations. The cost of complying with such regulations—i.e., the cost to construct one or more re-injection wells and the associated surface facilities—is quite high, on the order of $4 million.

One component dissolved in the excess condensate which may force the operator of a geothermal power plant to bear the cost of re-injection to comply with environmental regulations is boron. Geothermal brines and steam typically contain boron, and as a result the steam condensate obtained in the condenser contains boron.

Ironically, if the boron in the condensate could be controlled to low levels, its presence would actually be beneficial. Boron is one of sixteen important micro-nutrients needed for healthy crop growth— a factor favoring its presence in waters intended for agricultural purposes. On the other hand, boron in forms concentrated above the micronutrient level can inhibit starch formation and in yet higher concentrations prove toxic to plants. *The Water Encyclopedia*, Second Edition, by van der Leeden et al., Lewis Publishers, Inc. (1990), herein incorporated by reference in its entirety, specifies in Table 6-46 a 0.5 mg/l concentration as the "threshold level" below which the concentration "should be satisfactory for almost all crops and almost any arable soil." The "limiting concentration," "at which the yield of high-value crops might be reduced drastically, or at which an irrigator might be forced to less valuable crops" is identified as 2.0 mg/l. These limits are consistent with the data in Table 6-49 of van der Leeden et al. wherein the "permissible limits" for boron are broken down by crop group. For those most tolerant to boron, e.g., onion, asparagus, and date palm, the permissible limits are between 2 and 3 mg/l. For semi-tolerant crops, such as sunflower, potato, wheat, corn and lima bean, the permissible limits are between 1.33 and 2 mg/l. And for the most sensitive crops, such as pecans, plum, apple, and most especially citrus and avocado, the permissible limits are from 0.67 to 1 mg/l— values which are very much in line with the proposed 0.6 to 1 mg/l limits proposed for Federal drinking water regulations. See "An Update of the Federal Drinking Water Regs," by Pontius, *Journal AWWA*, February, 1995, herein incorporated by reference in its entirety.

Due to the sensitivity of many crops to the presence of boron, the boron concentration in water used for agricultural purposes often must comply with local water quality regulations. Citrus are among the most sensitive receptors to boron and are adversely affected at a level of 0.75 mg/l—the limit for irrigation water in the Philippines. See in particular pages 4468 and 4473 of the NPCC Rules and Regulations, *Official Gazette*, Vol. 74, No. 23, pp. 4467–4476, (1978) herein incorporated by reference in its entirety. In addition, the Philippines, per the Ministry, Bureau and Office Administrative Orders and Regulations, *Official Gazette*, Vol. 78, No. 1, pp. 52–54, which document is herein incorporated by reference in its entirety, set a 2 mg/l limit on boron for discharge to certain inland waters. The U.S. effluent standard is also 2.0 mg/l, per the 1978 Effluent Standards of the National Pollution Control Commission, herein incorporated by reference in its entirety.

Where no local regulations exist for boron in irrigation water, it would stand to reason that any water supplied or sold for irrigation obviously should not contain boron in a concentration greater than the toxicity level for the plant under cultivation. For example, 2 mg/l boron in water is harmful for rice growth. Hence, to be on the safe side, the boron concentration for waters supplied to rice fields should be no greater than 2 mg/l.

In light of the foregoing, it can be seen that condensate produced from boron-containing geothermal steam poses a difficulty for geothermal plant operations. The boron originally present in the geothermal steam and/or in the steam flashed from the brine, ultimately, after passage through the turbine, becomes a component of the liquid steam condensate. The boron concentration in the steam condensate is oftentimes far in excess of the 2 mg/l limit, requiring as a practical consequence that neither water directly taken from the condenser nor from cooling tower blowdown be used for high value agricultural purposes or discharged into rivers, streams, and the like. Both the condensate and the cooling tower blowdown must eventually be re-injected into the earth for environmental protection.

Another problem with boron relates to cooling tower "drift"—i.e., the moisture carried from the cooling tower into the air. If the moisture emitted from the cooling tower contains boron, say in a concentration of 2 mg/l or more, its ultimate deposition upon the ground can cause plant distress or death in the immediate vicinity—depending on the sensitivity of the local plants to boron. This "drift" problem is especially HI acute with respect to geothermal power plants processing superheated steam taken directly from the geothermal formation. As such formations become depleted, the boron concentration in the steam produced increases, resulting in increased boron concentration in the drift. In particularly acute situations the boron concentration in the drift can be exceedingly high—on the order of 100–250 mg/l—due to a combination of high boron in the steam condensate make-up and a cooling tower run with high cycles of concentration.

Besides boron, another contaminant in geothermal steam which can accumulate in the condensate in undesirable concentrations for irrigation purposes or for discharge to inland waters or to the environment in general (e.g., by distribution upon the soil) is arsenic. Arsenic generally does not present as pervasive a problem for geothermal operations as boron since its concentration in geothermal steam is usually low, as is its concentration in the resulting steam condensate. Nevertheless, there are instances where the geothermal steam can contain arsenic in unusually large concentrations to produce a condensate containing arsenic in a concentration too high for discharge per local regulations. Generally, a limit of 0.1 mg/l will pertain for discharge to the environment, and 0.05 mg/l is the usual maximum for drinking water, although Pontius reports that values in the range of 0.002 to 0.020 mg/l for drinking water were under consideration in the U.S. in 1995. Plant toxicity to arsenic varies widely, van der Leeden et al. indicating that the tolerance varies from as much as 12 mg/l for Sudan grass to less than 0.05 mg/l for rice. Perhaps because rice cultivation is an important agricultural activity in the Philippines, the maximum value permitted for irrigation is 0.01 mg/l, per the Philippines NPCC Rules and Regulations of 1978 set forth hereinbefore. These same regulations, however, set a maximum limit of 0.05 mg/l for most other fresh surface waters, including water used as the source of public water supply.

Another contaminant in geothermal steam which on occasion can be found to accumulate in unacceptable concentrations in the steam condensate produced in the condenser is mercury. Mercury presents similar difficulties in processing as discussed above with respect to boron, except that both mercury and arsenic are seldom present in sufficient concentration in the geothermal steam to cause a "drift" problem with respect to the surrounding neighborhood of the cooling tower.

SUMMARY OF THE INVENTION

It has been discovered in this invention that, as water condenses from steam in a condensing zone, as for example during passage through a turbine/condenser system in a geothermal power plant, contaminants such as boron, arsenic, and mercury are preferentially removed from the steam phase with the first liquid condensed. Hence, in the invention, a substantial proportion of one or more of such contaminants is captured in a contaminants-rich condensate produced at an early stage of steam condensation in the condensing zone while separately producing a contaminants-lean condensate from a later stage of condensation.

The present invention provides a method especially useful in a geothermal power plant processing steam containing boron, arsenic, and/or mercury through a turbine-condenser system. In particular, the invention provides a method for substantially reducing the concentration of these contaminants in the steam go condensate in the condenser of a geothermal power plant processing boron, arsenic, and/or mercury-contaminated steam by capturing a substantial proportion of one or more of these contaminants in a contaminant-rich fraction of steam condensate produced at an early stage of condensation in the turbine-condenser system. Preferably, enough of the contaminants are collected in this early produced fraction of steam condensate such that a later-produced fraction is contaminant-lean, containing the contaminants in individual concentrations suitable for beneficial use in agriculture or for discharge to a naturally occurring water body.

One specific method contemplated in the invention for removing these contaminants from a turbine-condenser system is by directing steam containing moisture produced in the turbine via the turbine drains to a steam/water separator operating subatmospherically. The moisture, rich in the contaminants but oxygen free, is collected either as a liquid for disposal or for such purposes as water sealing while the separated steam, lean in contaminants, is directed to the condenser.

Another specific method involves (1) extracting one or more streams of steam/moisture mixtures from an interstage location in the turbine, (2) demisting the steam to produce an oxygen-free, contaminant-rich water and a demisted steam, and then (3) directing the demisted steam to an ejector drawing non-condensable gases from the main condenser for condensing steam from the turbine exhaust.

In addition, the invention provides for enhancing the removal of boron, arsenic, mercury, and other contaminants from geothermal steam by scrubbing the steam prior to entry into the turbine using an aqueous alkaline liquid absorbent.

Further still, the invention provides a method for collecting moisture in the turbine exhaust between the turbine and the condenser, which for purposes herein includes the general area of the entryway into the condenser. The collected moisture, being oxygen-free, is then a useful liquid for use in many locations in the geothermal power plant.

The invention also provides a method, particularly applicable for lowering maintenance costs in operating a cooling tower associated with a power facility introducing an ammonia- and/or hydrogen sulfide-containing steam through a turbine-condenser system, wherein at least some of the ammonia or hydrogen sulfide is captured in an early produced fraction of the total condensate produced in said turbine-condenser system while a later produced fraction of lower ammonia or hydrogen sulfide content is used as make-up to the cooling tower. Since both ammonia and hydrogen sulfide are nutrients for microorganisms, lowering the rate at which such nutrients are introduced into the cooling tower system slows the growth rate of such microorganisms, which in turn lowers the rate at which biocide (and its attendant costs) must be fed to the cooling tower system to reduce fouling thereof. Maintenance costs are also reduced resulting from the longer time spans between outages necessitated for cleaning of the cooling tower system.

BRIEF DESCRIPTION OF THE DRAWING

All identical reference numerals in the figures of the drawing refer to the same or similar elements.

Figure 1:
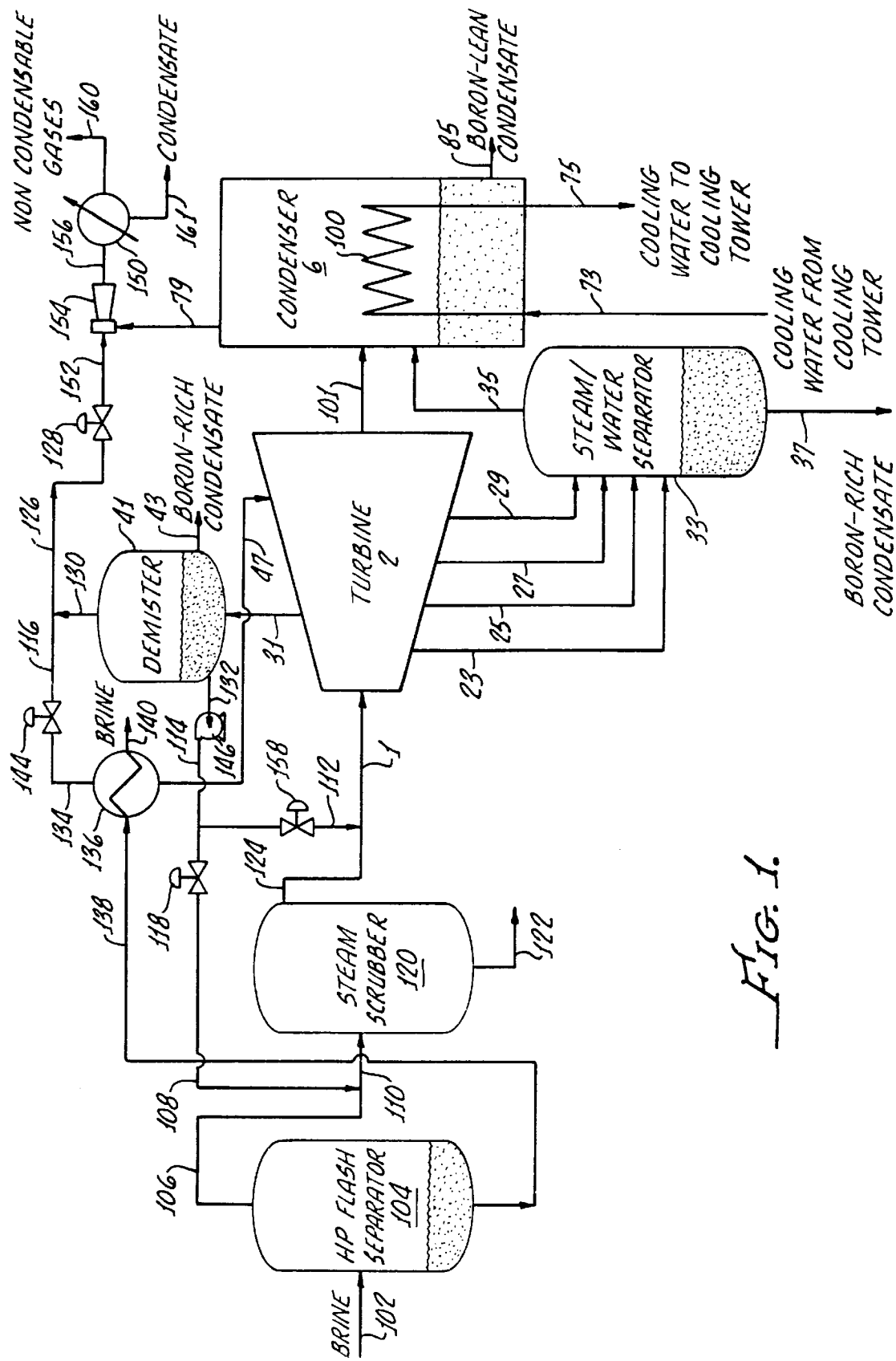
FIG. 1 of the drawing shows a process flowsheet of the relevant portions of a geothermal power plant processing a contaminants-containing steam through a condensing zone, i.e., a turbine-condenser system, in accordance with methods of the present invention.

It is to be understood that the drawing figures are presented in order to facilitate an understanding of the invention. To that end, many well known elements not needed for an understanding of the invention have been omitted.

DETAILED DESCRIPTION OF THE INVENTION

The present invention is directed in the best mode to methods for processing steam containing one or more contaminants selected from the group consisting of boron, arsenic, and mercury. For ease in describing the invention, the discussion to follow will mainly focus on processing boron-containing steam. It is to be understood, however, that the same methods will be applicable to processing steam containing other contaminants such as mercury or arsenic. Moreover, it is also to be understood that, as used herein, the terms "boron," "arsenic," and "mercury" each respectively encompasses its elemental form plus all compound forms thereof.

The present invention is founded in part on the discovery that the boron in boron-contaminated steam, as is the case with the typical steam derived from a geothermal resource, will, when liquid water condenses from the steam in a condensing zone (as by serial passage through the stages of a turbine and then through a condenser), tend to come out of the gas phase (i.e., the steam phase) and dissolve in the first liquid water condensed from the steam. The aim in the best mode of the present invention, therefore, is to process boron-contaminated steam such that, as liquid water is condensed from the steam, the initial liquid water condensed is collected separately from a later-condensed liquid water, with the former containing a higher concentration of boron than the latter. In the most preferred methods, the boron concentration in the initially-collected steam condensate will be much higher than in the later collected steam condensate, such that the concentration in the latter is so low that it can be used or sold for a beneficial purpose, such as irrigation or industrial water. The advantage thus offered by the best mode of the present invention as practiced in a continuous process is that the bulk of the boron in the boron-contaminated steam is captured in one or more boron-rich liquid streams containing steam condensate while the remainder of the steam condensate, instead of constituting a pollution problem requiring re-injection into the earth or subjection to a costly remediation process, becomes either a useful product for agricultural purposes or a benign liquid for discharge to the environment. (In some cases, the benign liquid will, but for the presence of hydrogen sulfide, be of essentially drinking water quality. Indeed, assuming the hydrogen sulfide is removed, the steam condensate has the advantage, as compared to typical drinking water, of being tritium-free, and this because geothermal steam rarely if ever contains tritium.) Moreover, in a geothermal power plant having a "drift" problem from its cooling towers, a further advantage is attained in that the pollution due to drift depositing boron in neighboring areas can be eliminated or substantially reduced.

The invention is most readily understood by reference to the drawing. FIG. 1 shows as part of a geothermal power plant a turbine-condenser system comprising turbine 2 and condenser 6. Turbine 2 is connected to an electrical power generator (not shown), and the turbine is powered by boron-contaminated steam introduced from the main steam supply via line 1, which steam, after passage through the turbine, exhausts by a suitable fluid communication system 101 to condenser 6. Condenser 6 may be either a surface condenser or, as is more common in a geothermal power plant, a direct contact condenser. As shown in FIG. 1, however, the condenser is a surface condenser of the tube-and-shell variety, with cooling water from a cooling tower (not shown) being introduced on the tube side via line 73, traversing the tubes 100 in the condenser, and exiting via line 75. The cooling water exchanges heat with the turbine steam exhaust, resulting in a steam condensate (i.e., liquid water) removed by line 85 and non-condensable gases removed by line 79.

For the geothermal power plant shown in FIG. 1, the ultimate source of the main steam for powering turbine 2 is brine in line 102 flashed to steam in high presssure flash separator 104. Alternatively, the source of the steam could be, for example, dry geothermal steam direct from the subterranean resource, in which case the flash separator would not be needed. In either case, the steam is considered herein as "geothermal steam" and will typically contain boron, usually in a concentration of about 0.1–20 ppm by weight (i.e., 0.1 to 20 lb. of boron per 1,000,000 lb. of steam), with the boron concentration generally being on the order of 5 ppm by weight. (The arsenic content will typically be in the range of 0.001 ppm (the analytical detection limit)

to about 5 ppm by weight. The mercury content in geothermal steam is generally below the analytical detection limit.)

The boron-containing main steam in line 106 usually requires a steam cleaning treatment in order to remove chlorides and other impurities which could cause corrosion and scaling the turbine. Accordingly, if steam cleaning is necessary or desired, water or other aqueous liquid absorbent may be added via line 108, and the water/steam admixture directed by line 110 to steam scrubber 120. Line 110 functions as a scrubbing zone wherein undesired constituents are absorbed into the water or other aqueous liquid absorbent introduced via line 108. Subsequently the liquid absorbent containing the absorbed impurities is recovered in scrubber 120 (which functions mainly as a liquid/gas separator) via line 122. Also recovered from scrubber 120 is the cleaned steam, which is directed by lines 124 and 1 into turbine 2.

Figure 2:
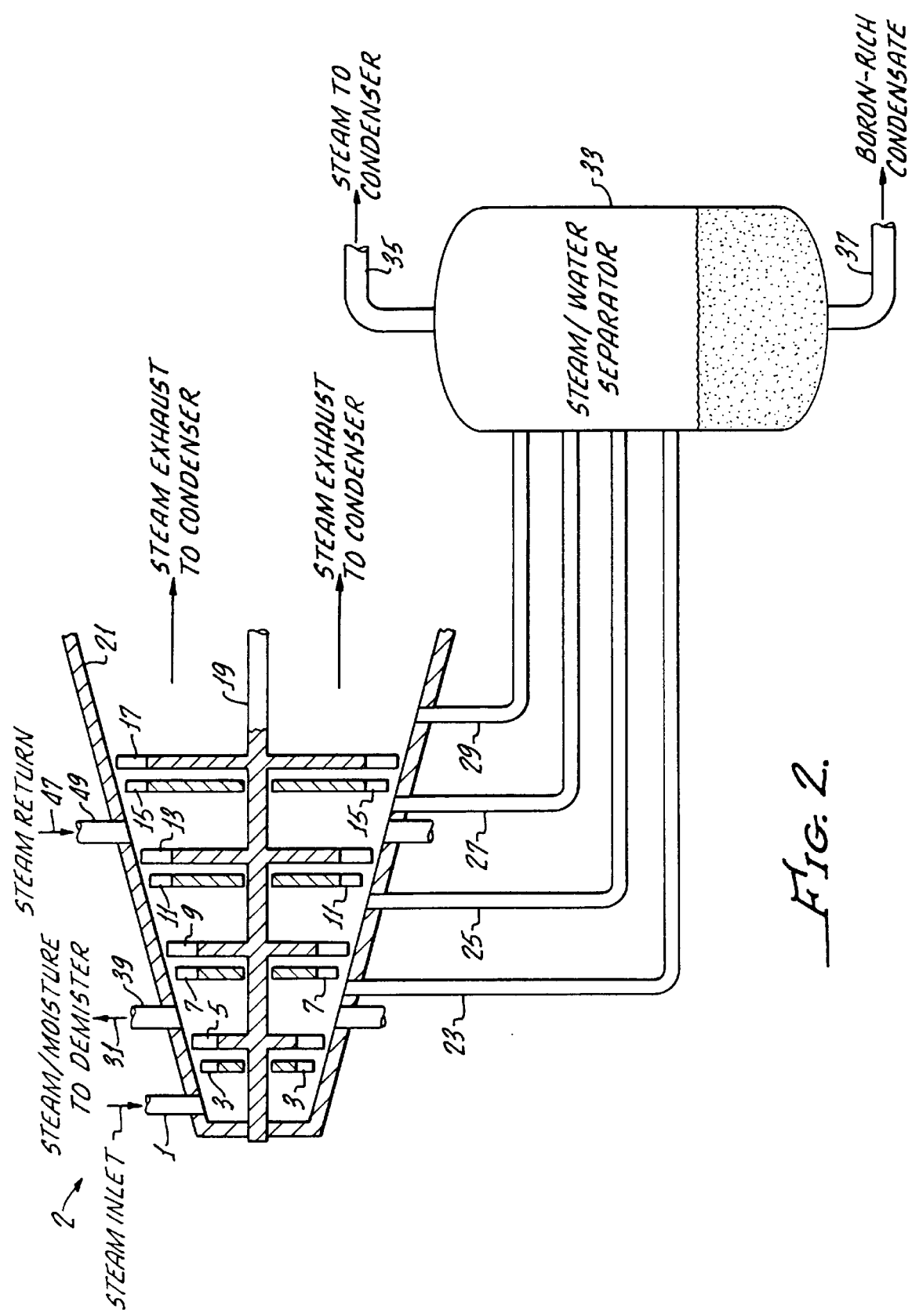
FIG. 2 of the drawing shows a four stage low pressure turbine useful in a geothermal power plant processing contaminants-containing steam, the turbine having means associated therewith for collecting contaminants-rich moisture forming in the turbine as a liquid condensate.

FIG. 2 focuses more specifically on turbine 2 and depicts a four stage low pressure turbine rotor wherein saturated boron-containing geothermal steam is introduced via line 1 passed through the turbine $1^{st}$ stage (nozzles 3 and rotating blades 5), then successively through the $2^{nd}$ stage (nozzles 7 and rotating blades 9), the $3^{rd}$ stage (nozzles 11 and rotating blades 13), and the $4^{th}$ stage (nozzles 15 and rotating blades 17), finally exiting the turbine and collected for passage to condenser 6 (shown in FIG. 1). The steam provides the motive force to spin the turbine assembly about rotating shaft 19 to drive the generator for producing electrical power. Essentially, this involves a two-step transfer of energy—first from the steam to the rotating turbine blades and then from the turbine to the generator to produce electrical energy.

As the geothermal steam passes through the turbine, the process of expansion and energy extraction causes steam to initially condense in the turbine itself in the form of moisture. For a typical geothermal saturated steam introduced into the turbine via line 1, the moisture content will be about 0–1% at the entrance of the turbine and about 10–15% at the exit. It is noted that the moisture content at the exit is not necessarily indicative of the total percentage of moisture which has condensed in the turbine because, among other considerations, some moisture may have been removed from the turbine. Indeed, in a preferred embodiment of the invention, some of the moisture in the steam passing through the turbine is removed, either through the turbine drains 23, 25, 27, and 29 or via one or more steam extraction lines, such as line 31 leading to demister 41 (shown in FIG. 1).

Figure 3:
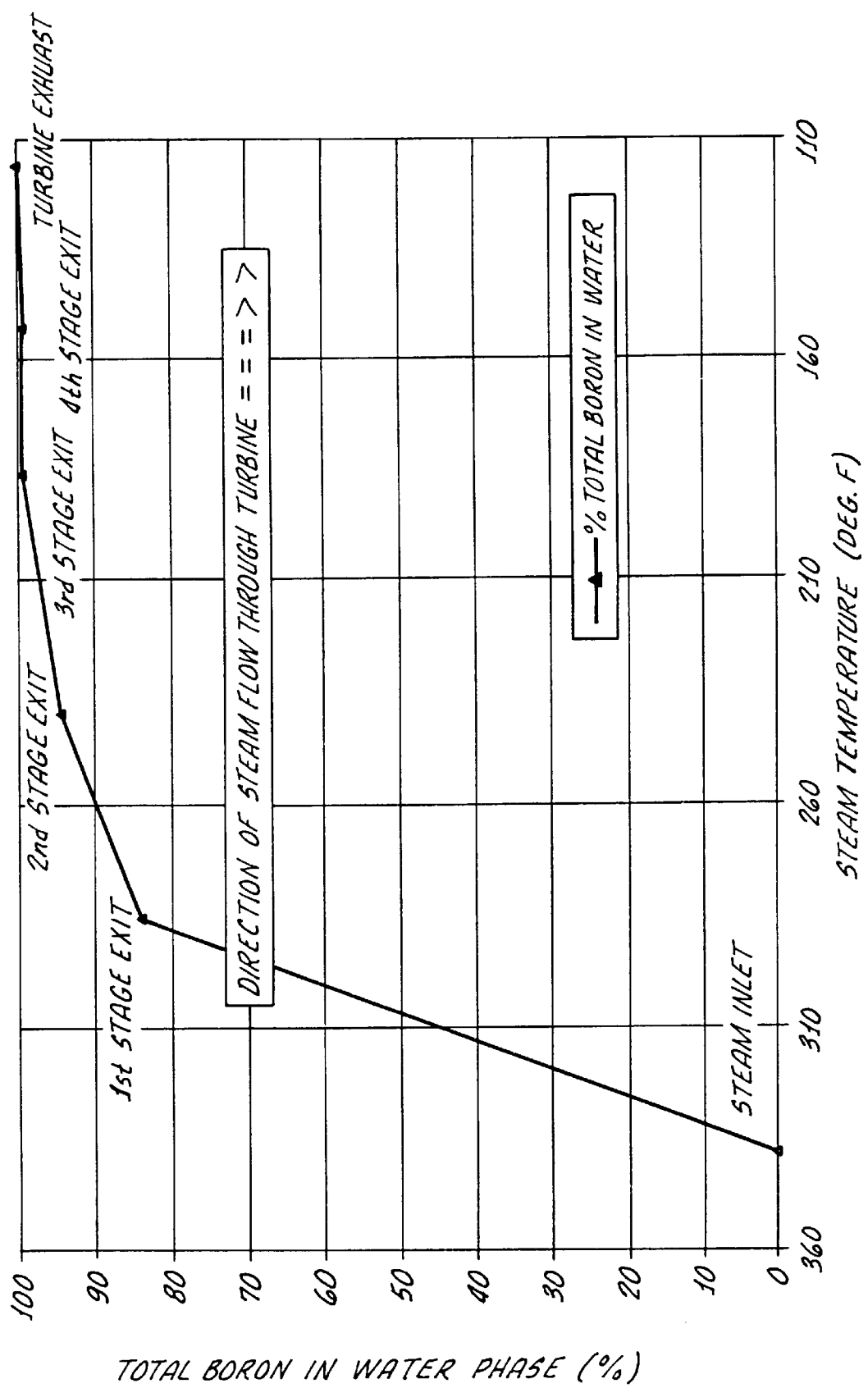
FIG. 3 is a graph plotting, for a boron-containing saturated steam initially at 325° F. processed through a typical five stage low pressure geothermal turbine, the fraction of boron in the moisture to the total boron introduced into the condensing zone as a function of temperature decrease caused by the expansion of the steam.

As moisture forms in the turbine, boron rapidly leaves the steam phase and enters the condensed liquid moisture phase. This is shown graphically in FIG. 3 for a saturated geothermal steam at an initial turbine inlet temperature of 325° F. and pressure of about 100 psia processed through a five stage low pressure (LP) turbine having no means associated therewith for removal of moisture prior to entry into the condenser. Roughly 85% of the boron is absorbed into the moisture after the steam exits the first stage at a temperature of about 285° F. At this point, about 1–3%, typically about 2%, of the steam has condensed as moisture. About 95% is absorbed after the steam exits the second stage at about 250° F., at which point about 2–6%, usually about 4%, of the steam has condensed as moisture. And by the time the steam exits the fifth and final stage, virtually all the boron (98%+) has collected in the moisture, at which time about 15% of the steam has condensed as moisture.

The foregoing values were based on processing a specified geothermal steam—initially at 325° F. and of saturated quality—through a specified turbine—i.e., a five-stage LP turbine. For geothermal steams at other initial temperatures, pressures, and steam quality processed through other turbines, the results will vary, particularly as to the moisture content at various locations in the turbine. But regardless of the steam being treated or the turbine involved, the boron in the steam passing through the turbine preferentially collects with the first water condensed from the steam. For a typical low pressure, low temperature boron-containing steam passed through a typical LP turbine-condenser system of a geothermal power plant, it is believed that about 70–90% of the boron will dissolve into approximately the first 5% of steam condensed. A higher percentage, usually over 85%, and typically about 90–97%, will dissolve in the first 10% of steam condensed. Virtually 100% of the boron will be captured by the time the steam exits the turbine, by which time 10–15% of the steam has condensed as moisture.

From the foregoing information, it can be seen that the concentration of boron in the water being condensed is high at the outset, and decreases thereafter. For example, with respect to the 325° F. saturated geothermal steam exemplified above, when 85% of the boron dissolves in the first 5% of moisture to condense, the boron concentration is much higher than when 95% dissolved in 10% of the moisture, which in turn is higher than when virtually 100% of the boron was captured in 15–20% of the moisture. Again, these values will vary depending upon the particular geothermal power plant under consideration, particularly if ammonia is present in the steam to raise the pH of the condensed moisture, which is believed to increase the solubility for boron. But the two important, salient facts are that (1) a great percentage of the boron in the geothermal steam collects in the moisture formed in the turbine and (2) the concentration of the boron in the moisture is greatest when the boron first comes out of the gas phase and enters the moisture and progressively decreases thereafter. These facts offer some flexibility in removing the boron by its capture in the moisture produced in the turbine. For example, depending on the particular turbine-condenser system under consideration, it may be decided to capture all the moisture produced in the turbine or, in other situations, to capture only that portion which is highly concentrated in boron. Indeed, yet other options are possible, such as capturing the most highly concentrated moisture as one liquid stream and a portion or all of the remainder as a separate liquid stream. Exactly which option will be most useful for a given power plant will depend on a host of factors, such as the initial boron concentration of the steam entering the turbine, the concentration level to which the boron is desired or tolerable in the condensate of condenser 6, the temperature of the steam entering the turbine, the temperature at the exit of each stage, the concentration of ammonia in the steam entering the turbine, and the ability or practicability of removing moisture at various locations along the turbine train.

In any event, in accordance with the invention, the aim when processing boron-containing steam through a turbine-condenser system is to capture some or all of the moisture produced in the turbine, or immediately thereafter, so that a steam of reduced boron content is introduced into the condenser (or a portion of the condenser) to produce a corresponding steam condensate of reduced boron content. Stated another way, the bulk of the boron in the steam is captured in an early-produced boron-rich fraction(s) of the total steam condensate, which fraction(s) preferably include all of the initially produced moisture, thereby providing for a subsequently produced boron-lean steam condensate fraction(s) of properties so benign as not to require re-injection into the earth. Embodiments of the invention for accomplishing these objectives, along with a further embodiment for increasing the efficiency of the steam scrubber 120 for removing boron, will now be explained in more detail.

Moisture, entrained in the steam as a mist as it passes through the turbine, is removed (as illustrated in FIG. 2) in three general locations. Some exits the turbine with the exhaust to the condenser. Some is pushed by centrifugal force against the shell 21 of turbine 2 and is collected and removed in the turbine drains, shown in FIG. 2 as four interstage drains 23, 25, 27, and 29. The remainder is drawn through line 31 with steam to be used for beneficial purposes in the power plant.

Normally, in conventional operation, water collected in the turbine drains is directed to the condenser, to mingle with the water produced from condensing the turbine exhaust steam. However, in one embodiment of this invention, the boron-rich steam condensate in the turbine drains is deliberately not introduced into the condenser and indeed is kept segregated from the condensate in condenser 6. In this embodiment, shown in FIGS. 1 and 2, the liquid/steam mixtures entering the four interstage drains are directed to a steam/water separator 33 operating subatmospherically, from which is obtained steam relatively free of boron via exit pipe 35 and a stream of boron-rich water via pipe 37. In this manner, a significant proportion of the boron which entered the turbine is captured in the liquid exiting pipe 37. Typically, over 25%, usually about 35–60%, of the boron in the steam entering the turbine is collected and removed with the water leaving the turbine drains, this water usually constituting less than 10%, often about 2–8%, and typically about 5% of the total steam condensate produced in the turbine/condenser system. Hence it can be seen that the invention in this embodiment provides a method for capturing a significant amount of boron in a relatively small stream of water while keeping the captured boron from entering the condenser to contaminate the condensate produced therein.

The invention provides yet another method for removing moisture high in boron content from the turbine-namely by drawing off steam containing moisture via circumferential manifold 39 (shown in FIG. 2) and directing the steam via line 31 to demister 41 (shown in FIG. 1), or other suitable liquid/vapor separator, to collect the moisture and recover it as a stream of boron-rich condensate in line 43. If desired, boron-rich condensate recovered in demister 41 may be used as the water source for line 108 for the aqueous liquid scrubbant needed to remove chlorides and other impurities, the boron-rich condensate being directed to line 108 via line 132, pump 146, and line 114, with valve 118 being open.

The steam relatively free of boron exiting demister 41 can be used for any convenient and appropriate beneficial use in the geothermal power plant. Preferably, in order to increase turbine efficiency by reducing the moisture content downstream of entry of line 47 into manifold 49, some of the steam recovered from demister 41 is superheated and then directed to manifold 47 in a superheated condition. This can be achieved, for example, by indirect heat exchange with a hot geothermal brine, such as the residual brine obtained after high pressure flashing. For this purpose, the steam would be directed by lines 130, 116 and 134 and valve 144 to surface heat exchanger 136, there to exchange heat with brine which enters the exchanger via line 138 and exits via line 140, the superheated steam then being directed by line 47 to an interstage location (downstream of manifold 39) in turbine 2. Also in the preferred embodiment, some of the steam from demister 41 is utilized as the motive force for a steam ejector to remove non-condensable gases from main condenser 6. As shown in FIG. 1, to achieve this end, the steam would be directed by lines 130, 126, and 152 and valve 128 to ejector 154 which directs the non-condensable gases in line 79 via line 156 to ejector condenser 150 wherefrom the non-condensable gases are released to the atmosphere by line 160 while recovering a steam condensate via line 161. Directing steam from turbine 2 through demister 41 as in this embodiment to ejector 154 has two advantages in addition to removing boron from the turbine-condenser system: (1) the steam being used to power the ejector is of reduced boron content, so its ultimate discharge should present no environmental difficulties and (2) the steam carries a considerable proportion of the non-condensable gases that entered the turbine, so the load on ejector 150 is reduced because it needs to remove a lower amount of non-condensable gases from condenser 6.

One advantage in extracting steam from the turbine via line 31, regardless of how it is ultimately used, resides in the fact that, while the concentration of boron in the water condensing in the turbine is greatest in the earliest stages of the turbine, the amount of condensate produced in the earliest stages is relatively small, and of that relatively small amount, only a portion-usually only a minor portion—is recoverable in the turbine drains. Thus, the present embodiment improves the efficiency of recovering boron in a relatively small fraction of the total condensate ultimately produced from the steam by drawing steam from the turbine at a location where the moisture is of a relatively high boron concentration and demisting that steam in order to capture the moisture as a boron-rich liquid stream. The percentage of boron entering the turbine which is captured by this method will vary, depending on such factors as the location where steam is drawn from the turbine to the demister, the rate at which the steam is drawn off, its moisture content, and the boron concentration of the moisture. Generally, when this method is employed, at least 10%, preferably at least 20%, and most preferably at least 30% of the boron entering the turbine is captured in the demister 41 (or other liquid-vapor separator), with the fraction of liquid condensate collected in demister 41 and recovered therefrom as a boron-rich liquid usually being on the order of 2–10%, preferably 2–6%, of the total condensate produced in the turbine-condenser system.

In an alternative embodiment of the invention, steam scrubber 120 is operated with an alkaline liquid absorbent so as to enhance the removal of boron from the main steam. Specifically, the pH of the absorbent may be raised above 7.0, preferably to about 8–10, by using a suitable base, such as caustic or soda ash. The preferred base, however, is ammonia, since it provides the advantage that its carry-over into the turbine is innocuous and, indeed, serves as an aid to reduce stress corrosion cracking of the turbine blades while also enhancing the removal of boron into the moisture produced in the turbine. More specifically, some or all of the ammonia will dissolve into the moisture produced in the turbine, thereby increasing its capacity for absorbing boron.

It is to be noted that the scrubber will effect some removal of boron (and arsenic) from the steam, even if only water is the scrubbant used therein. With water alone, about 25% of the boron (and about 50% of the arsenic) can be removed from the steam. Depending upon the level of boron to be tolerated in the boron-lean condensate ultimately to be removed from the condenser 6 via line 85, the boron may present difficulties discussed hereinbefore when its concentration in the steam leaving the scrubber and entering the turbine is at a threshold value of about 0.5 ppm by weight, with increasingly higher concentrations (e.g., above 1 ppm, above 2 ppm, above 3 ppm, above 4 ppm, etc.) causing increasingly more serious difficulty in disposing of the steam condensate from the condenser. (For arsenic, the troublesome threshold value is about 0.01 ppm by weight, with values increasingly above that value, e.g., above 0.05 ppm, above 0.1 ppm, above 0.5 ppm, etc., causing increasingly more difficulty in disposing of the condensate. Mercury, as stated hereinbefore, is generally too low in geothermal steam to be detected analytically, although it can sometimes be detected in the steam condensate in troublesome values exceeding 0.002 mg/l.)

If the steam recovered from the steam scrubber in main steam line 124 is superheated, one may choose to add water on a continuous basis into the steam to increase the amount of moisture present in the turbine, which in turn provides for greater recovery of boron in liquids recovered therefrom, e.g., via the turbine drains or via line 31 leading to demister 41. The water would usually be introduced into line 1 at a sufficient rate to ensure that moisture is present in the steam in one of the early turbine stages, preferably in the first stage or between the first and second stages. The source of water added to the main steam for this purpose is not critical but is preferred to be a steam condensate. One option shown in FIG. 1 is to continuously direct into line 1 a boron-rich, oxygen-free condensate recovered in line 132 from demister 41 by pump 146, lines 114 and 112, and valve 158. The preferred method for adding the water to the steam is by injecting water into the turbine steam chest immediately upstream of the first stage of the turbine along the outside edge of the $1^{st}$ stage nozzles.

In yet another embodiment, the present invention provides for the removal of boron by collecting boron-containing moisture in the steam exiting the turbine and/or entering the condenser. In essence, any suitable method for capturing this moisture and segregating it from the boron-lean condensate being produced in the condenser is applicable. Preferably, this is accomplished with as little additional pressure drop as practicable. One general method for carrying out this embodiment of the invention is to collect boron-rich water films that inherently develop on the internal surfaces in the turbine exhaust area and/or in the entrance portion of the condenser. By providing channels and drains in appropriate locations, the water films can be directed by gravity—or by the centrifugal force in the turbine exhaust ducts—to the drains for removal from the turbine-condenser system. In turn, these methods can be enhanced, for example, by using demister vanes to force more water to the walls of the turbine exhaust or condenser entry or by lining the walls, or portions thereof, with appropriate materials for collecting more water at the walls. Among the suitable materials include shaved metal, steel wool, and pressed or woven plastic pads, such as "Scotch-Brite" commercial scouring pads.

Figure 4:
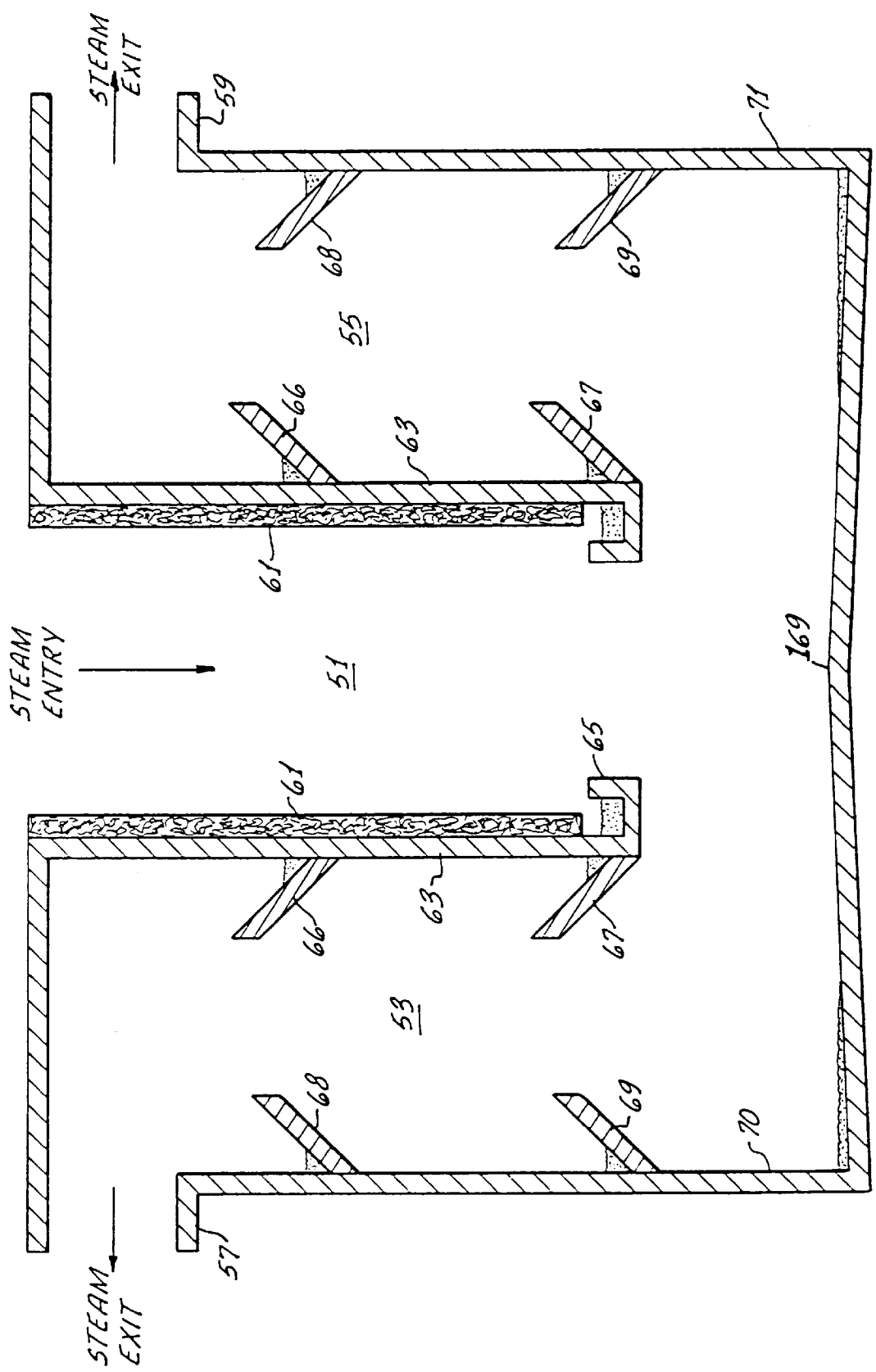
FIG. 4 shows in cross-section an entryway into a geothermal condenser, the entryway being designed to enhance the capture of contaminants-containing liquids in steam passing through the entryway into the main portion of the condenser.

FIG. 4 shows an example of the foregoing methods as applied to an entryway into the condenser. In particular, FIG. 4 depicts in cross-section a plenum chamber in which the steam containing moisture from the turbine exhaust is introduced at the top of rectangular entryway chamber 51, subsequently exiting and dividing into two streams at the bottom. The two streams enter chambers 53 and 55, respectively, and rise to the top to exit via exit lines 57 and 59, respectively, into the main portion of the condenser, i.e., the portion where steam is condensed by heat exchange with a coolant fluid. Steel wool 61 is mounted internally on sidewalls 63 of entryway chamber 51, and at the bottom of chamber 51 is a liquid collection channel 65 around the inner perimeter of chamber 51. In both chambers 53 and 55 are upper and lower vanes 66 and 67 welded to the exterior of wall 63, and upper and lower vanes 68 and 69 welded to the interior of wall 70 in the case of chamber 53 and wall 71 in the case of chamber 55. The vanes are mounted at an upward angle to the flow of the steam. Floor 169, having its highest point in the center, declines gradually to walls 70 and 71.

In operation, as steam containing boron-containing moisture is introduced into entryway chamber 51 of the plenum chamber, the inherent film-forming tendency of sidewalls 63 is substantially enhanced by the presence of the moisture-retaining property of steel wool 61, with the water film thus created descending by gravity into collection channel 65. In chambers 53 and 55 the upwardly-directed vanes increase the surface area for liquid to collect. Moisture collecting as a film on the upper surface of upper vanes 66 and 68 collects in the channel formed by the "V" where each vane meets its respective sidewall. Moisture forming on the lower surface of upper vanes 66 and 68 cascades as a film down the vane and its associated sidewall to collect in the "V" of lower vanes 67 and 69, respectively. Moisture forming on the lower surface of each lower vane 69 cascades sequentially down its underside and associated sidewall to the corners where the sidewalls meet floor 169, there to collect and pool with liquid from the water film forming on floor 169 itself. In each location where pools of liquid form—channel 65, the "V" of the vanes, and floor 69—the plenum is designed with drains and associated piping (not shown) for directing the collected liquid to a location external to the condenser. Because the boron in the moisture-containing steam entering the condenser plenum is preferentially contained in the moisture of the steam or in the moisture forming in the plenum, the collected liquid will contain a significant proportion of the boron that entered the plenum in the moisture-containing steam. And by directing this collected liquid (which is boron-rich water) to locations outside the condenser, the steam which exits the plenum via pipes 57 and 59 will be of reduced boron-content so that the resulting condensate produced from this exiting steam in the main portion of the condenser will be of reduced boron content-i.e., reduced in comparison to what the boron content would have been without the use of the boron-collecting method as described above with respect to FIG. 4.

Figure 5:
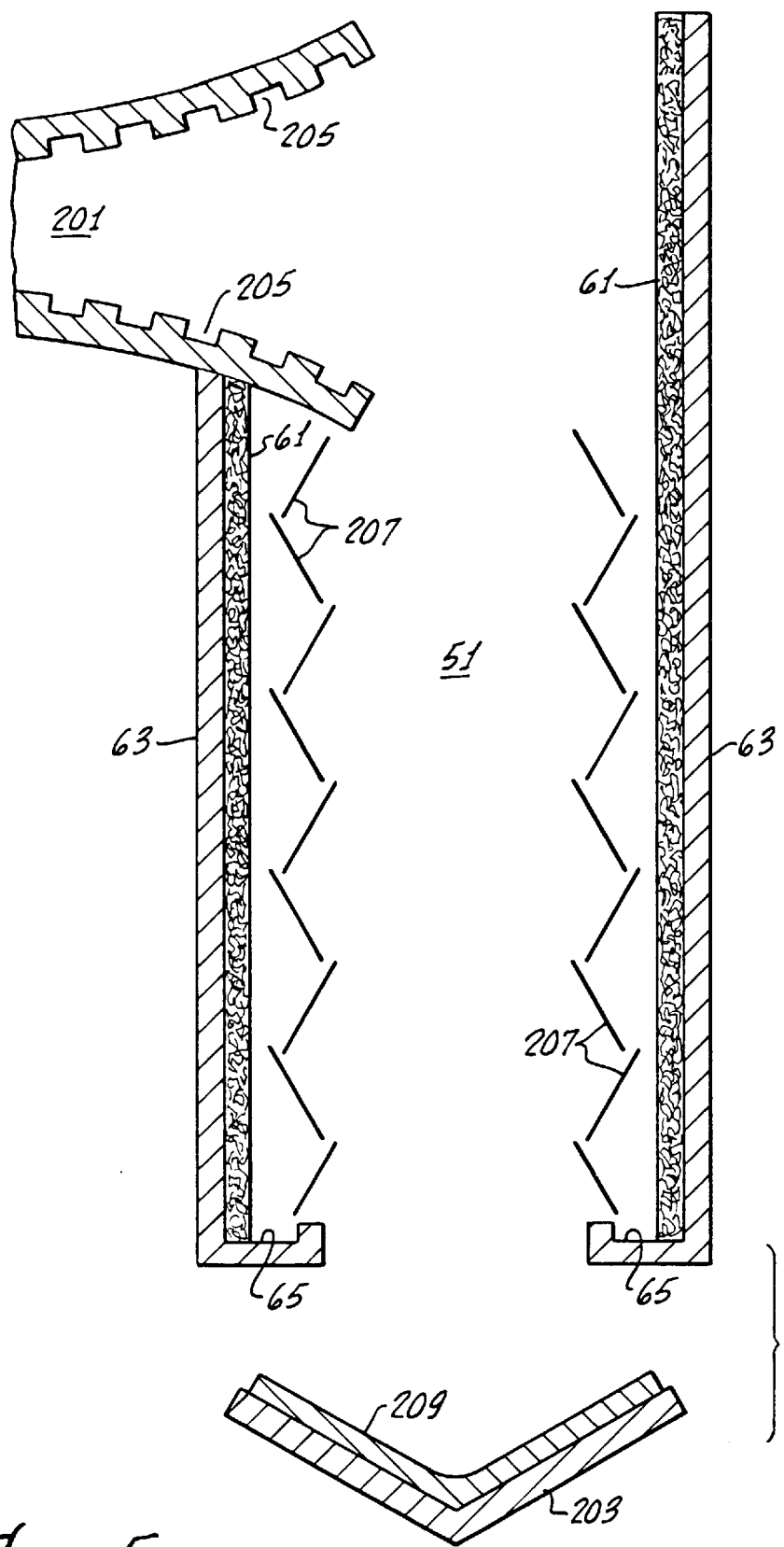
FIG. 5 shows in cross-section yet another entryway into a geothermal condenser designed in accordance with the invention to enhance the capture of contaminants-containing liquids in steam passing through the entryway into the main portion of the condenser.

FIG. 5 shows another condenser entryway embodiment of the invention as could be applied to a turbine exhaust and downflow plenum found on many commercial direct contact condensers, such as those used at Units 1 to 6 of the Tiwi geothermal power plant in the Philippines. FIG. 5 depicts one of the two turbine exhaust diffusers 201 that discharge boron-containing steam into the rectangular downflow plenum 51 of the condenser. Steam flows to the bottom of plenum 51 and then into the main portion of the condenser where the steam is condensed by direct contact with a coolant liquid.

In the invention, the boron-rich moisture carried in the steam in diffuser 201 is collected in the following ways. Moisture is collected through the centrifugal action of the steam through water collecting grooves 205 in the wall of diffuser 201. Steel wool 61, mounted on the plenum sidewalls 63, retains any moisture which comes in contact with the wall, preventing it from being stripped off, and re-entrained, by the turbulence of the steam. Moisture collected on the walls ultimately gathers in collection channels 65 integral with sidewalls 63 at the bottom of plenum 51. Demister vanes 207 are arranged by design to minimize pressure drop while directing more moisture to the walls and into integral collection channels 65. More moisture is collected in the moisture-retaining pads 209, such as "Scotchbrite" pads, on the upper surface of V-shaped drain surface 203 mounted just beneath plenum 51 but above the liquid level of the steam-condensing portion of the condenser. The boron-rich liquid collected in the water-collection devices 65, 205, and 203 is then directed (by means not shown) through the external wall of the condenser to be kept separate and apart from the steam condensing in the main portion of the condenser. (If desired, the water collecting in grooves 205 may be separately directed, by means not shown, to combine with the water/steam mixture in the final turbine drain line 29 leading to separator 33.)

In alternative embodiments to the invention, the entire steam flow exhausting from the turbine could, prior to entry into the condenser, be passed through a full-flow demister using vanes to direct moisture to the walls. Alternatively still, the entire flow could be directed through structured packing of low pressure drop design. In both such embodiments, as well as those depicted in FIGS. 4 and 5, the design would include means for directing the captured moisture to a location external to the condenser to be segregated from the boron-lean steam condensate produced therein.

Yet another method for capturing boron in the steam from the turbine is by condensing in the main portion of the condenser at least two separate steam condensate fractions, with the first fraction produced having a higher boron content than any subsequently produced fraction. One such method, involving capture of the bulk of the boron in the steam in a first fraction of steam condensate and segregating this fraction from the remainder of the steam condensate produced, is depicted schematically in FIG. 6. Condenser 6 in this embodiment may be, for example, a shell-and-tube type condenser in which the steam is condensed on the shell side of the condenser while cooling water from a cooling tower (or other coolant working fluid) is introduced on the tube side via line 73 and exiting via line 75. The boron-containing steam from the turbine is introduced into the condenser via line 101 and is condensed through exchange of heat with the coolant, with any remaining non-condensable gases being removed via line 79. The condenser 6 contains an appropriate barrier 81 to segregate steam condensate first produced from the steam entering the condenser from condensate produced thereafter. Thus, as the steam undergoes condensation, the first fraction of the steam to condense, which will contain a high proportion of the boron which entered the condenser, is collected and segregated from a second but much larger fraction containing a low proportion of the boron which entered the condenser. The first fraction (i.e., boron-rich condensate) is recovered via line 83 while the remaining second fraction of low boron content is removed via line 85 and used for beneficial uses, e.g., agricultural irrigation and cooling tower make-up.

Figure 6:
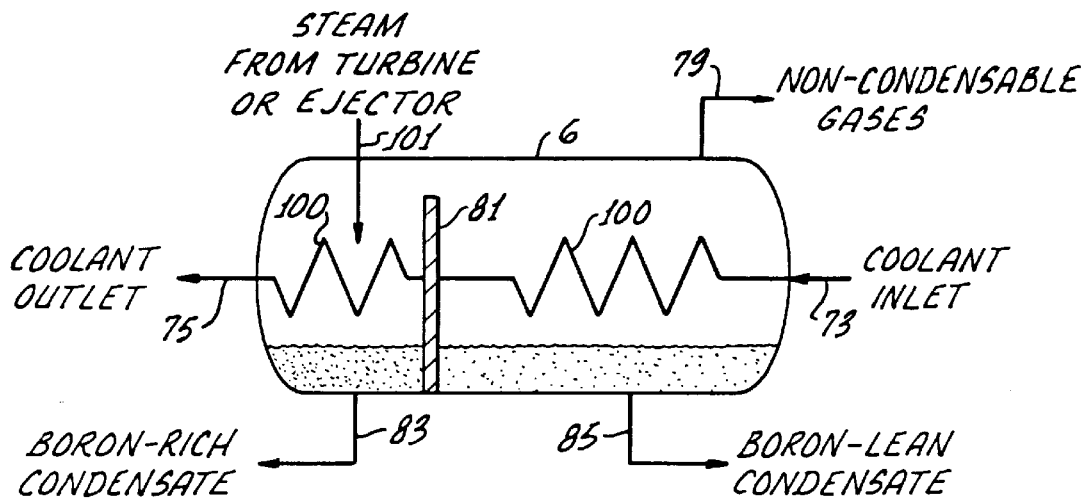
FIG. 6 is a schematic diagram of a shell-and-tube condenser designed in accordance with the invention to produce from contaminants-containing steam a contaminants-rich steam condensate fraction and a contaminants-lean steam condensate fraction.

The foregoing embodiment of the invention as illustrated in FIG. 6 is especially useful for those geothermal power plants which introduce superheated steam into the turbine and produce little or no moisture in the turbine. Likewise, this embodiment is applicable when the existing turbine design cannot be modified to allow for recovery of substantial amounts of moisture directly from the turbine, as by the methods previously described with respect to removing moisture via the turbine drains or by steam extraction via line 31. In such cases, due to either the lack of moisture created in the turbine or the impracticality of removing water directly from the turbine, the process shown in FIG. 6 achieves the same end result—producing one or more streams of boron-rich condensate isolated from a boron-lean condensate. In addition, it is contemplated that the embodiment illustrated in FIG. 6 would also be useful even when the steam to be condensed does not necessarily come from a steam turbine. For example, the embodiment illustrated in FIG. 6 is contemplated as an especially useful design for an ejector condenser operating with boron-containing steam as the motive force. Likewise, it would also be a suitable choice for a binary heat absorption unit. As to the latter, a liquid hydrocarbon or similar working fluid introduced via line 73 would vaporize (or become superheated if it already is in vapor form) as it condenses the boron-containing geothermal steam entering by line 101. The heated hydrocarbon vapor would then exit via line 75 to be subsequently used as the motive force for a binary turbine (not shown).

Figure 7:
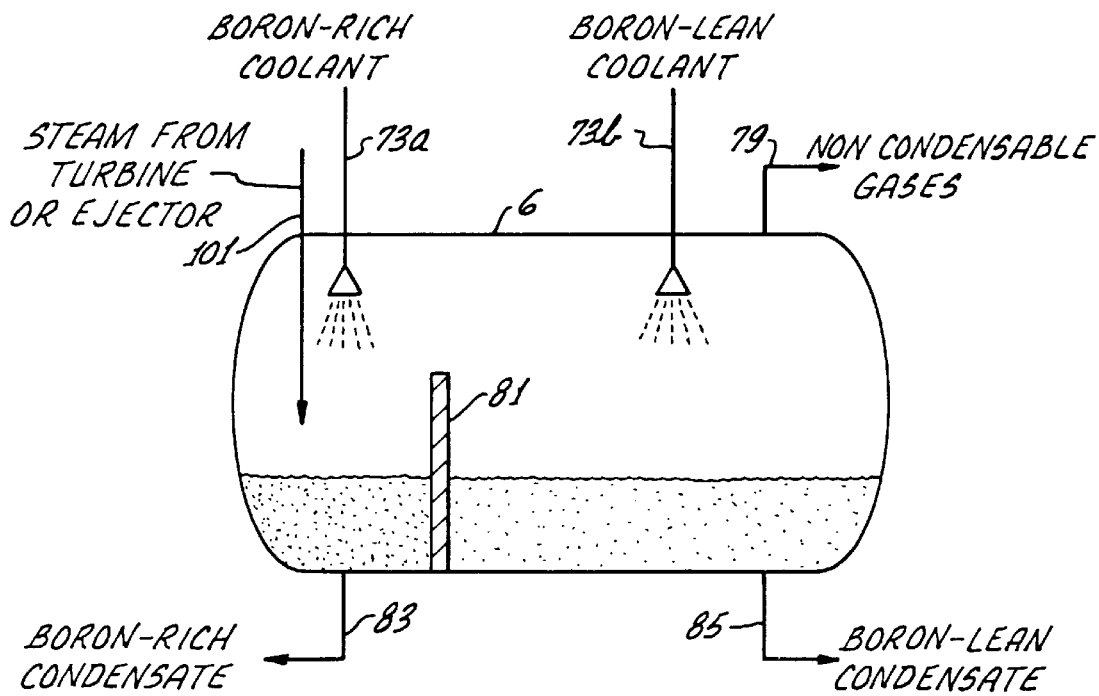
FIG. 7 is a schematic diagram of a direct contact condenser designed in accordance with the invention to produce from contaminants-containing steam a first liquid stream comprising a contaminants-rich steam condensate fraction and a second liquid stream comprising a contaminants-lean steam condensate fraction.

A modified version of the condenser shown in FIG. 6, but of the direct contact design instead of shell-and-tube design, is shown in FIG. 7. As with the embodiment depicted in FIG. 6, steam is introduced via line 101 into a first condensing zone wherefrom a boron-rich condensate is collected via line 83, with residual steam then passing to a second condensing zone on the other side of barrier 81, where it is condensed and collected as a boron-lean condensate in line 85. Coolant liquid is introduced via lines 73a and 73b into the first and second condensing zones, respectively, and used as the medium for condensing steam by direct contact. Any convenient source of water may be used for the coolant, but, in the preferred embodiment, the coolant is derived from two independent sources. The first coolant source, for line 73a, is boron-rich, oxygen-free condensate collected upstream of condenser 6, for example, in demister 41 and/or separator 33 shown in FIG. 1. If necessary, this condensate may first be cooled in order to effectively function as a coolant introduced into condenser 6. The second coolant source, for line 73b, is from the main cooling tower. Contact of steam and the second coolant produces a boron-lean condensate, which, contained in a condensate/second coolant mixture, is used as makeup to the cooling tower via line 85.

The foregoing embodiment depicted in FIG. 7 may be used as a geothermal main condenser. Hence, it is shown with reference numerals in the drawing pertaining to the main condenser. However, this embodiment is more especially contemplated as an ejector condenser for an ejector (not shown in the drawings) operating with a boron-rich steam as the motive force when a boron-lean ejector condensate containing extremely low levels of boron—e.g., less than 0.5 mg/l, preferably essentially zero mg/l—is desired.

Figure 8:
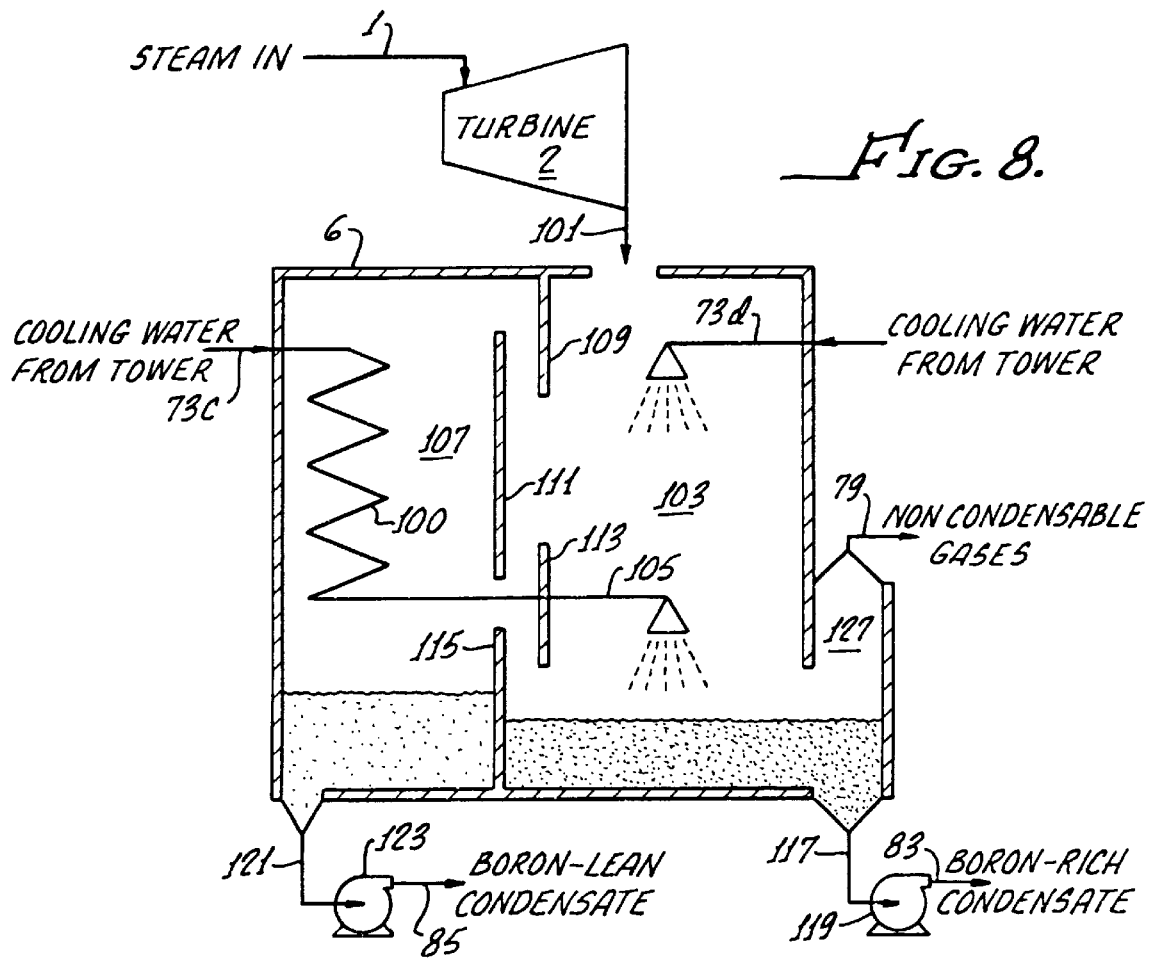
FIG. 8 is a schematic diagram of yet another condenser—of combined surface condenser and direct condenser design—to produce from contaminants-containing steam (a) a liquid stream comprising a contaminants-rich steam condensate fraction and (b) a contaminants-lean steam condensate fraction in accordance with the invention.

Yet another embodiment for carrying out the invention is shown in FIG. 8, which depicts condenser 6 as a "hybrid" surface-direct contact condenser. Steam entering turbine 2 via line 1 exhausts via line 101 into direct contact chamber 103 wherein the first fraction of steam entering condenser 6 is condensed. Cooling water from the cooling tower (not shown) is introduced into chamber 103 via line 73d and also via line 105, the latter after passage from line 73c through the tube side 100 of the shell-and-tube surface condenser in chamber 107. Wall barriers 109, 111, 113, and 115 are provided to ensure that steam condensed in each chamber is collected in its lower portion and kept separate from condensate collected in the other chamber. The wall barriers further ensure that the steam exiting from the direct contact chamber 103 must travel tortuous paths to enter the surface condenser chamber 107, with any condensate developing on both sides of barriers 109 and 113 and on the right side of barriers 111 and 115 tending by gravity to collect in the condensate collected in the lower portion of direct condenser chamber 103 while condensate forming on the left side of wall barriers 111 and 115 tend by gravity to collect in the condensate collected in the lower portion of surface condenser chamber 107. Inasmuch as the first fraction of the steam entering condenser 6 is condensed in direct contact chamber 103, the condensate of this first fraction will be boron-rich while that of the second, smaller fraction condensed in surface condenser chamber 107 will be boron-lean. In addition, and importantly, whereas the boron-rich condensate will be oxygen-rich, having come in contact with, and commingling with, the oxygenated cooling tower water from lines 73d and 105, the boron-lean condensate collected in surface condenser chamber 107 will be oxygen-free for purposes of geothermal operation. The oxygenated, boron-rich fraction of the condensate is then returned to the cooling tower via line 117, pump 119, and line 83 while the oxygen-free, boron-lean condensate is directed via line 121, pump 123, and line 85 either to disposal, beneficial uses in the geothermal plant, or beneficial purposes external thereto, i.e., irrigation or discharge to the environment. Any non-condensable gases produced in condenser 6 are passed via passageway 127 leading to a line 79 directed, for example, to a gas cooler or ejector (not shown) for further handling.

A noteworthy advantage of the foregoing "hybrid" embodiment, in common with condensation performed in a surface condenser, is that, if "drift" is not a problem at the particular geothermal facility, the boron concentration in the cooling tower can be run up to high levels by allowing high cycles of concentration, thus decreasing maintenance and chemical costs as compared to operation with a direct contact condenser.

Figure 9:
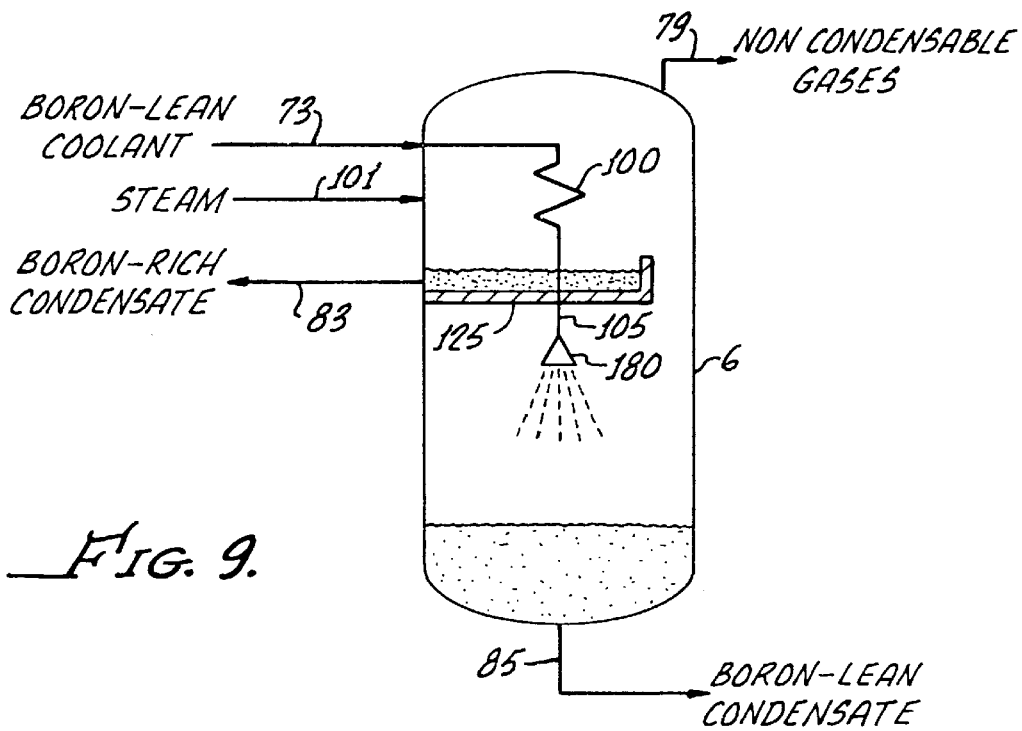
FIG. 9 is a schematic diagram of yet another condenser—of combined surface condenser and direct condenser design—to produce from contaminants-containing steam a contaminants-rich steam condensate fraction and a liquid stream comprising a contaminants-lean steam condensate fraction in accordance with the invention.

Another "hybrid" condenser in accordance with the invention is depicted in FIG. 9. As with the embodiment shown in FIG. 7, this condenser, although useful as a main condenser and depicted with reference numerals pertaining thereto, is more especially contemplated for an ejector condenser associated with an ejector (not shown in the drawings) operating with a boron-rich steam as the motive force when a boron-lean ejector condensate containing extremely low levels of boron—e.g., less than 0.5 mg/l, preferably essentially zero mg/l—is desired. The coolant, which is usually liquid from the cooling tower, is introduced into condenser 6 via line 73, passes through cooling tubes 100, and then into line 105, which, after passing through L-shaped tray 125, terminates in sparger 180. Some of the boron-containing steam entering via line 101 initially condenses and collects on tray 125 as a boron-rich condensate, which is removed by line 83. The remainder of the steam passes to the lower section of condenser 6 and therein is condensed by direct contact with coolant introduced from sparger 180. The resulting liquid containing boron-lean condensate is removed from the condenser by line 85 and then used, for example, as make-up to the cooling tower. For both this embodiment, and that shown in FIG. 7, the attainment of an extremely low level of boron in the boron-lean condensate recovered in line 85 will itself depend, in great measure, upon the sources of make-up to the cooling tower introducing, overall, very little boron into the cooling tower system.

It is, of course, within the concept of the invention to combine one or more of the foregoing or equivalent methods for producing one or more fractions of the steam condensate having a relatively high concentration of boron, and segregating or isolating these produced fraction(s) from that portion of the condenser wherein one or more boron-lean fractions are subsequently produced. Given the main aim for which the present invention is currently envisioned—producing a significant amount of boron-lean condensate not requiring re-injection into the earth by capturing the bulk of the boron in an early produced fraction of the total steam condensate—all of the foregoing methods for producing boron-rich condensate fractions can be used, usually as part of one of two overall process designs. The first design aims to capture the bulk of the boron in one or more manageable liquid streams constituting a small fraction of the total condensate, thereby producing a relatively large fraction of boron-lean steam condensate to be used, for example, partially as make-up to a cooling tower system and partially for discharge to the environment or for agricultural purposes. For this embodiment, the methods discussed hereinbefore with respect to demister 41 and the embodiments depicted in FIGS. 2, 4, 5, and 9 are most particularly applicable, as are the embodiments shown in FIGS. 6 and 7 when barrier 81 is located (as shown in the Figures) close to the steam inlet line 101. In the second design, the boron-rich fraction will be much the larger fraction, usually constituting over 50%, indeed, preferably over 65% or more, of the total steam condensate, with the remainder being largely the boron-lean condensate not requiring re-injection into the earth. The condenser design shown in FIG. 8 is most particularly applicable for this method, as are the embodiments of FIGS. 6 and 7 when barrier 81 is modified to be located a substantial distance away from the steam inlet line 101.

While both of the two overall designs accomplish the same end result—producing a liquid from the main condenser that does not require re-injection into the earth, each design has distinct advantages. The advantage of the second design, at least for the preferred embodiment, is simplicity in disposing of the boron. More specifically, the bulk of the boron is ultimately directed to the cooling tower system and then, following normal practice for cooling tower blowdown, re-injected into the earth. On the other hand, the first overall design is more useful when concentrating boron in the cooling tower system is not a viable option, for example, due to cooling tower "drift" problems, or if the cooling tower blowdown cannot be re-injected but must be disposed of on the surface. Likewise, this second design is of advantage if, in the particular geothermal power plant, it is deemed advantageous to capture and segregate the boron in one or more manageable boron-rich liquid streams constituting only a small proportion of the total steam condensate. Usually, in embodiments within this design, the boron-rich liquid streams will constitute in total less than about 25%, preferably less than 20%, more preferably less than 15%, and most preferably less than 10% of the total steam condensate produced in the turbine-condenser system. Even more preferred is if such fractions constituted less than 8%, more preferably less than 5%, and most preferably less than 3%, of the total condensate produced in the turbine-condenser system. These fractions of boron-rich liquid streams can (as will be detailed hereinafter) find use in a variety of ways in the geothermal power plant. Alternatively, they may be directed to disposal (e.g., by lines 43 or 37), as by re-injection into the geothermal formation. Inasmuch as such re-injection involves only a small fraction (and preferably only a very small fraction) of the total condensate produced in the turbine-condenser system, and since the cost of re-injection wells is largely a function of the volumetric liquid flow rate required for re-injection, the cost of such re-injection wells will be significantly lower as compared to what would be required if all the produced condensate not needed for cooling tower make-up had to be re-injected. And obviously, the smaller the ratio of total boron-rich fractions required to be re-injected to the total condensate produced, the greater will be the cost savings involved for re-injection of the boron-rich liquid.

Regardless of which of the two overall designs is chosen, an advantage is realized in handling the excess steam condensate not needed for cooling tower purposes. A typical geothermal power plant ultimately requires at least about 70% of the total steam condensate produced in the turbine-condenser system for cooling tower needs (i.e., for evaporation plus blowdown). The excess steam condensate constitutes at least about 5%, often at least 8%, and typically at least 10%, up to a maximum of about 30% of the total steam condensate yielded in the turbine-condenser system. The advantage offered in the invention is that a significant fraction (or all) of this excess steam condensate is obtained from the condenser as one or more boron-lean liquid streams not requiring re-injection; hence a savings in the costs for re-injection. In preferred embodiments of the invention, at least 50%, more preferably at least 65%, more preferably still at least 75%, and most preferably at least 85% or more of the excess steam condensate is not re-injected into the earth. Rather, it is disposed of on the earth's surface, e.g., by environmental discharge, and preferably to irrigate plants under cultivation.

The total of boron-rich liquid streams produced in the process of the invention—either containing a major proportion of the total steam condensate in accordance with the first design described above or containing a minor proportion in accordance with the second—will, ideally and preferably, carry as much as possible of the boron introduced into the turbine. (For calculation purposes herein, the amount of boron or other contaminant introduced into the turbine is determined immediately after the final process step (if any) for removing impurities from the impure geothermal steam while neglecting boron introduced by recycle into the steam after that location. Thus, for the system depicted in FIG. 1, the calculated rate at which boron is introduced into turbine 2 is the total of boron entering from line 124. Boron entering as recycle via line 112 and possibly line 47, the latter as carry-over from the demister, is not included.) At least 50%, usually at least 70%, and, if possible, preferably at least 80% of the boron (or other contaminant) is contained in the total of the boron-rich fractions. Alternatively stated, and focusing on the boron-lean condensate produced in line 85 by the continuous process shown in FIG. 1 instead of the boron-rich condensate, the boron-lean condensate is recovered via line 85 carrying boron at a mass rate no greater than 50%, usually no more than 30%, and preferably no more than 20% of the mass rate for boron entering the turbine. (These same percentages also apply for contaminants other than boron.) For the embodiment shown in FIG. 1, wherein a surface condenser is employed for condenser 6, the foregoing percentages would be calculated by dividing the mass rate of boron carried in line 85 by the mass rate of boron introduced via line 124, and multiplying the result by 100. The same calculation would be involved for a direct contact condenser, except that the mass rate of boron entering the condenser with the coolant would have to be subtracted from that leaving the condenser in order to determine the boron mass rate of the boron-lean condensate carried in line 85. Similar calculations, as would be apparent to those skilled in the art, would apply to a hybrid condenser design.

The boron concentration in the boron-lean condensate produced in the condenser and yielded via line 85 is reduced as compared to operation without production and segregation of the boron-rich fractions as described above. Normally some boron will be present in the boron-lean condensate but preferably within limits such that some of it may safely be discharged to the environment. More specifically, it is contemplated that, when the main aim is the release of a liquid stream from the condenser to the environment, the first criteria of the geothermal operator will be to determine what maximum target level of boron is desired for the boron-lean condensate to be removed from the condenser for this purpose. Then, given (among other things) the condenser design, the concentration of boron in the geothermal steam entering the turbine, the rate at which coolant from a cooling tower is used directly to condense steam in the condenser, and the concentration of boron in such coolant, the determination to be made is how much boron must be continuously removed in stream(s) of boron-rich condensate in order to achieve the desired boron concentration in the boron-lean condensate. Once that determination is made, then one can take advantage of one or more of the numerous examples herein provided, and their obvious equivalents, to capture the necessary amount of boron in liquid streams comprising boron-rich condensate, and segregate such streams from the remainder of the steam condensate.

In the preferred embodiment, the boron concentration of the boron-lean condensate (or boron-lean condensate plus coolant liquid) produced from the condenser 6 via line 85 is no greater than 2 mg/l, more preferably no greater than 1 mg/l, even more preferably no greater than 0.75 mg/l, and most preferably no greater than 0.5 mg/l. Assuming levels below 0.5 mg/l can be achieved, a preferred maximum concentration would be 0.4 mg/l, with 0.2 mg/l and 0.1 mg/l being, respectively, more preferred and most preferred. If arsenic is a contaminant to be captured by the method of the invention, the arsenic content of the arsenic-lean condensate is preferably maintained below 0.10 mg/l and more preferably below 0.05 mg/l. Another contaminant which can be removed by the methods taught above for boron is mercury, with the preferred mercury level in the mercury-lean condensate being no more than 0.002 mg/l.

In the best mode of the invention, one or more of the liquid streams comprising boron-rich condensate produced in accordance with the invention are advantageously employed within the geothermal power plant. For example, when operating in accordance with the first of the overall designs described above, the boron-rich fraction(s) constituting the majority of the total steam condensate can be used as make-up to the cooling tower. The second design also offers possibilities for use (and thus avoiding re-injection) of the boron-rich fraction(s)—and this despite the fact that the boron-rich fraction(s) constituting a minority of the total steam condensate will be far more concentrated in boron than would be the case in the first design. In one embodiment, useful for a geothermal power plant operating as in FIG. 1 with a shell-and-tube condenser 6 without a cooling tower "drift" problem, some or all of the boron-rich condensate can be used as makeup to the cooling tower. Alternatively, one or more of the boron-rich fractions can be used as the feed to an evaporative process for producing boric acid. It will also be recognized that many of the boron-rich fractions will be oxygen-free when produced in the turbine—and also in the condenser when a surface condenser is employed for condenser 6. These boron-rich but oxygen-free fractions—for example, the boron-rich streams produced in lines 37, 43, and 132 in the geothermal power plant depicted in FIG. 1—or the boron-rich fraction captured in line 83 shown in FIG. 6—can be used for various purposes, e.g., as a pump sealant or as a source of additional moisture introduced into the main steam supply via line 112 for enhancing boron removal in the turbine, or both. Yet another possibility is as a source of make-up for the water introduced via line 108 for chloride or other contaminant removal purposes (i.e., steam cleaning). In those geothermal power plants making extensive use of the boron-rich, oxygen-free condensate, it may prove convenient to direct many or all of the boron-rich fractions to a single tank for commingling and segregation from the boron-lean condensate being produced in condenser 6 for recovery via line 85, the tank then being a source of oxygen-free boron-containing water for appropriate use throughout the plant.

In yet another embodiment of the invention, when the geothermal steam entering the turbine contains ammonia and/or hydrogen sulfide, any of the methods discussed hereinbefore for capturing and segregating boron-rich condensate stream(s) will also be useful in capturing some (or all) of the ammonia and/or hydrogen sulfide in corresponding ammonia- and/or hydrogen sulfide-rich condensate stream(s). The ammonia, in particular, will rapidly partition into the moisture phase of the steam, and due to the resulting increase in pH of the moisture, hydrogen sulfide will tend more rapidly to dissolve into the moisture phase. The advantage of this embodiment of the invention lies most especially with respect to cooling tower maintenance. That is, because ammonia and hydrogen sulfide are nutrients for microorganisms, the more of each that is present in steam condensate used as make-up to a cooling tower, the faster will be the rate at which the cooling tower will become fouled and/or the greater will be the cost in continuously adding biocide in order to control the fouling. The latter is especially a problem when a direct contact condenser is used and the cycles of concentration are relatively low, i.e., on the order of 3 to 5. In any event, capturing and segregating ammonia and/or hydrogen sulfide from the steam condensate used for cooling tower make-up—preferably to the extent of capturing and segregating at least 25%, more preferably at least 50%, and most preferably at least 75% of either or both of the contaminants—will result in substantially reduced cost for biocides and/or substantially increased time periods between maintenance shutdowns of the cooling tower for cleaning (with, of course, the costs being progressively more decreased and the time periods between maintenance shutdowns being progressively increased with progressively greater capture and removal of ammonia and/or hydrogen sulfide). In addition, when the geothermal steam is initially relatively low in boron, arsenic, and/or mercury contaminants, to the point that the segregated ammonia- and/or hydrogen sulfide-rich fractions containing such contaminants can be used for agricultural purposes, the segregated fractions can be used for irrigation purposes not only to water plants under cultivation but also to provide a source of nitrogen and/or sulfur nutrients thereto.

Although the invention has been described above in conjunction with the best mode of operation as well as alternative embodiments, it is evident that many other alternatives, modifications, and variations will be apparent to those skilled in the art in light of the foregoing description. For example, the description focused on the three contaminants of boron, mercury, and arsenic, but the invention is likewise suitable for capturing other contaminants in steam which readily partition from the steam phase to the liquid phase upon condensation of the steam, e.g., as shown above for ammonia. Moreover, even if the geothermal steam under consideration is free of contaminants or contains contaminants in relatively low concentrations not requiring their removal, many embodiments of the invention, e.g., the embodiment shown in FIG. 4, would be useful in producing oxygen-free water for use in those portions of the geothermal power plant where such a liquid would be of benefit. (For purposes of this invention in all embodiments, a liquid is "oxygen-free" when it contains dissolved oxygen in a concentration no greater than 100 ppb (0.1 mg/l).) Additionally still, while the focus of the present description has been on geothermal steam passed through a turbine-condenser system, it should be apparent that the invention is applicable to any contaminant(s)-containing steam processed through a system where an initial or early-produced fraction of the total condensate can be collected and segregated from a later produced fraction of the total condensate produced from the steam. (The terms "total condensate" or "total steam condensate," as used in the specification and claims herein, are synonymous and refer to the total of all liquid water yielded from the system under consideration from wet or dry steam introduced therein.) Accordingly, it is intended to embrace in the invention all such alternatives, modifications, and variations as fall within the spirit and scope of the appended claims.

I claim:

1. A process comprising:
   (1) introducing geothermal steam containing a contaminant selected from the group consisting of boron and arsenic into a turbine of a turbine-condenser system;
   (2) removing from said system a liquid comprising one or more early-produced, contaminant-rich fractions of total condensate produced in said turbine-condenser system; and
   (3) segregating at least some of said liquid removed in step (2) from said turbine-condenser system,
   wherein the liquid so segregated is less than 15% of the total condensate but contains more than 50% of at least one of said contaminants introduced into the turbine condenser system.

2. A process as defined in claim 1 wherein said liquid removed in step (2) consists essentially of said one or more early-produced, contaminant-rich fractions, said liquid consisting essentially of a portion of the first 50% of total condensate produced in the turbine-condenser system.

3. A process as defined in claim 2 wherein said liquid contains condensate produced in said turbine.

4. A process as defined in claim 2 wherein said liquid consists essentially of condensate produced in said turbine.

5. A process as defined in claim 2 wherein said liquid contains condensate recovered on wall surfaces as the steam passes between the turbine and the condenser of said turbine-condenser system.

6. A process as defined in claim 5 wherein said liquid contains condensate recovered on wall surfaces as the steam passes through an entryway into said condenser.

7. A process comprising:
   (1) introducing geothermal steam containing a contaminant selected from the group consisting of boron, mercury, and arsenic into a turbine of a turbine-condenser system;
   (2) removing from said system a liquid comprising an early-produced, contaminant-rich fraction of total condensate produced in said turbine-condenser system;
   (3) segregating at least some of said liquid removed in step (2) from said turbine-condenser system; and
   (4) removing from the condenser of said turbine-condenser system a contaminant-lean fraction of total condensate, said contaminant-lean fraction being produced later than said early produced fraction and having a boron content no greater than 2 mg/l, an arsenic content no greater than 0.05 mg/l, and a mercury content no greater than 0.002 mg/l, with said early produced, contaminant-rich fraction containing at least one of boron, arsenic, or mercury in a concentration above the foregoing respective concentration values.

8. A process as defined in claim 7 wherein some of said later-produced fraction is used for make-up to a cooling tower and the proportion of the remainder that is re-injected into a geothermal formation is less than 50%.

9. A process as defined in claim 8 wherein said proportion is less than 25%.

10. A process as defined in claim 8 wherein said proportion is less than 10%.

11. A process as defined in claim 8 wherein said proportion is essentially zero.

12. A process comprising:
   (1) introducing geothermal steam containing boron, arsenic, or mercury into a turbine-condenser system in which the steam is passed serially through the turbine and condenser while producing steam condensate;
   (2) removing steam condensate containing boron, arsenic, or mercury from the system at one or more locations in the turbine-condenser system where more than 50% of the total steam condensate has yet to be produced, said removed steam condensate including at least some steam condensate recovered after the final stage of said turbine; and (3) preventing at least some of said steam condensate removed in step (2) from contacting steam and condensate in the condenser of said turbine-condenser system.

13. A process as defined in claim 12 wherein said steam condensate in step (2) is removed in a plurality of locations where more than 50% of the total steam condensate has yet to be produced in the turbine-condenser system.

14. A process as defined in claim 12 wherein the total of steam condensate removed in step (2) contains at least 80% of the boron, arsenic, or mercury introduced into the turbine.

15. A process as defined in claim 12 wherein said geothermal steam, prior to entry into said turbine of the turbine-condenser system, has been pre-treated by contact with an alkaline liquid.

16. A process as defined in claim 15 wherein said alkaline liquid comprises ammonium hydroxide.

17. A process as defined in claim 12 wherein said geothermal steam entering the turbine contains ammonia.

18. A process as defined in claim 12 wherein at least some of said steam condensate in step (2) is removed at a location where more than 70% of the total steam condensate has yet to be produced in said turbine-condenser system.

19. A process as defined in claim 12 wherein at least some of said steam condensate is removed in step (2) at a location where more than 85% of the total steam condensate has yet to be produced in said turbine-condenser system.

20. A process as defined in claim 12 wherein said steam entering said turbine contains boron in a concentration of at least 3 ppm by weight or arsenic in a concentration of at least 0.01 ppm by weight.

21. A process as defined in claim 12 wherein said steam entering said turbine contains boron in a concentration of at least 4 ppm by weight or arsenic in a concentration of at least 0.05 ppm by weight.

22. A process as defined in claim 7, 10 or 12 wherein said steam entering said turbine contains boron in a concentration of at least 5 ppm by weight or arsenic in a concentration of at least 0.25 ppm by weight.

23. A process as defined in claim 7, 10 or 12 wherein said steam entering said turbine contains boron in a concentration of at least 6 ppm by weight or arsenic in a concentration of at least 0.5 ppm by weight.

24. A process as defined in claim 7, 10 or 12 wherein said steam entering said turbine contains boron in a concentration of at least 7 ppm by weight or arsenic in a concentration of at least 0.75 ppm by weight.

25. A process as defined in claim 7 or 12 wherein said steam entering said turbine contains boron in a concentration of at least 8 ppm by weight or arsenic in a concentration of at least 1 ppm by weight.

26. A process as defined in claim 7, 10 or 12 wherein said steam entering said turbine contains boron in a concentration of at least 9 ppm by weight or arsenic in a concentration of at least 1.5 ppm by weight.

27. A process for condensing geothermal steam containing a contaminant selected from the group consisting of boron, mercury, and arsenic, the process comprising
   (1) condensing in a condensing zone a fraction of said geothermal steam to produce a first liquid condensate containing at least one of said contaminants in a concentration such that the remaining steam is of reduced boron, arsenic, or mercury concentration;
   (2) removing at least some of said first liquid condensate from said condensing zone;
   (3) preventing return of at least some of said removed first liquid condensate to said condensing zone;
   (4) condensing in said condensing zone at least some of said remaining steam to produce a second liquid condensate of lower boron, arsenic, or mercury concentration than for said first liquid condensate; and
   (5) evaporating a substantial proportion but less than 100% of said second liquid condensate in a cooling tower system, with at least some of the remainder not being re-injected into a subterranean formation.

28. A process as defined in claim 27 wherein a coolant liquid for condensing steam in said condensing zone is provided from said cooling tower system.

29. A process as defined in claim 28, wherein, of the total condensate produced in said condensing zone, the first liquid condensate represents less than 15% and the second liquid condensate evaporated in the cooling tower system in step (5) represents at least 70%, with said remainder constituting the balance and being at least 5%.

30. A process as defined in claim 27 wherein none of said remainder of said second liquid condensate is re-injected into a subterranean formation.

31. A process as defined in claim 27 wherein at least some of the remainder of said second liquid condensate is discharged to the environment.

32. A process as defined in claim 27 wherein at least some of said second liquid condensate is used for irrigation purposes.

33. A process comprising:
   (1) introducing geothermal steam containing a contaminant selected from the group consisting of boron and arsenic into a turbine of a turbine-condenser system;
   (2) removing from said system a liquid comprising one or more early-produced, contaminant-rich fractions of total condensate produced in said turbine-condenser system; and
   (3) segregating at least some of said liquid removed in step (2) from said turbine-condenser system, wherein the liquid so segregated constitutes at least 2 but less than 15% of the total condensate but contains more than 25% of at least one of said contaminants introduced into the turbine condenser system.

34. The process of claim 33 wherein the liquid so segregated contains more than 35% of at least one of said contaminants introduced into the turbine-condenser system.

35. The process of claim 34 wherein the liquid so segregated constitutes less than 10% of the total condensate.

36. The process of claim 33 wherein the liquid so segregated constitutes less than 10% of the total condensate.

37. The process of claim 36 wherein the liquid so segregated contains more than 50% of at least one of said contaminants introduced into the turbine-condenser system.

38. The process of claim 33 wherein the liquid so segregated contains more than 50% of at least one of said contaminants introduced into the turbine-condenser system.

39. The process of claim 36 wherein the liquid so segregated contains at least 70% of at least one of said contaminants introduced into the turbine-condenser system.

40. The process of claim 33 wherein the liquid so segregated contains at least 70% of at least one of said contaminants introduced into the turbine-condenser system.

41. The process of claim 36 wherein the liquid so segregated contains at least 80% of at least one of said contaminants introduced into the turbine-condenser system.

42. The process of claim 33 wherein the liquid so segregated contains at least 80% of at least one of said contaminants introduced into the turbine-condenser system.

43. A process comprising:
   (1) introducing geothermal steam containing a contaminant selected from the group consisting of boron and arsenic into a turbine of a turbine-condenser system;
   (2) removing from said system a liquid comprising one or more early-produced, contaminant-rich fractions of total condensate produced in said turbine-condenser system; and (3) segregating at least some of said liquid removed in step (2) from said turbine-condenser system, wherein the liquid so segregated constitutes less than 20% of the total condensate but contains more than 25% of at least one of said contaminants introduced into the turbine condenser system.

44. The process of claim 43 wherein the liquid so segregated contains more than 50% of at least one of said contaminants introduced into the turbine-condenser system.

45. The process of claim 43 wherein the liquid so segregated contains at least 70% of at least one of said contaminants introduced into the turbine-condenser system.

46. The process of claim 43 wherein the liquid so segregated contains at least 80% of at least one of said contaminants introduced into the turbine-condenser system.

47. The process of claim 43 wherein the liquid so segregated contains more than 35% of at least one of said contaminants introduced into the turbine-condenser system.

48. A process comprising:
(1) introducing geothermal steam containing a contaminant selected from the group consisting of boron and arsenic into a turbine of a turbine-condenser system;
(2) removing from said system a liquid comprising one or more early-produced, contaminant-rich fractions of total condensate produced in said turbine-condenser system; and
(3) segregating at least some of said liquid removed in step (2) from said turbine-condenser system, wherein the liquid so segregated constitutes less than 30% of the total condensate but contains more than 50% of at least one of said contaminants introduced into the turbine condenser system.

49. The process of claim 48 wherein the liquid so segregated contains at least 70% of at least one of said contaminants introduced into the turbine-condenser system.

50. The process of claim 49 wherein the liquid so segregated constitutes less than 25% of the total condensate.

51. The process of claim 48 wherein the liquid so segregated constitutes less than 25% of the total condensate.

52. The process of claim 48 herin the liquid so segregated contains at least 80% of at least one of said contaminants introduced into the turbine-condenser system.

53. The process of claim 52 wherein the liquid so segregated constitutes less than 25% of the total condensate.

54. A process comprising:
(1) introducing geothermal steam containing a contaminant selected from the group consisting of boron and arsenic into a turbine of a turbine-condenser system;
(2) removing from said system a liquid comprising one or more early-produced, contaminant-rich fractions of total condensate produced in said turbine-condenser system; and
(3) segregating at least some of said liquid removed in step (2) from said turbine-condenser system, wherein the liquid so segregated constitutes at least 20 but less than 50% of the total condensate but contains at least 70% of at least one of said contaminants introduced into the turbine condenser system.

55. The process of claim 54 wherein the liquid so segregated contains at least 80% of at least one of said contaminants introduced into the turbine-condenser system.

56. A process comprising:
(1) introducing geothermal steam containing a contaminant selected from the group consisting of boron and arsenic into a turbine of a turbine-condenser system;
(2) removing from said system a liquid comprising one or more early-produced, contaminant-rich fractions of total condensate produced in said turbine-condenser system; and
(3) segregating at least some of said liquid removed in step (2) from said turbine-condenser system, wherein the liquid so segregated constitutes less than 10% of the total condensate but contains in excess of 20% of at least one of said contaminants introduced into the turbine condenser system.

57. The process of claim 56 wherein the liquid so segregated constitutes at least 2% of the total condensate.

58. A process comprising:
(1) introducing geothermal steam containing at least one contaminant into a turbine of a turbine-condenser system;
(2) removing from said system a liquid comprising one or more early-produced, contaminant-rich fractions of total condensate produced in said turbine-condenser system; and
(3) segregating at least some of said liquid removed in step (2) from said turbine-condenser system, wherein the liquid so segregated contains a greater percentage of at least one of said contaminants than said liquid represents to the total condensate, said liquid containing more than 25 percent of at least one contamnant introduced into the turbine condenser system.

59. The process of claim 58 wherein said contaminant is selected from the group consisting of boron, arsenic, mercury, ammonia, and hydrogen sulfide.

60. The process of claim 58 wherein said contaminant is selected from the group consisting of boron and arsenic.

61. The process of claim 60 wherein the liquid so segregated constitutes more than 50% of the total condensate but contains at least 70% of at least one of said contaminants introduced into the turbine-condenser system.

62. The process of claim 61 wherein the liquid so segregated constitutes more than 65% of the total condensate.

63. The process of claim 62 wherein the liquid so segregated contains at least 80% of at least one of said contaminants introduced into the turbine-condenser system.

64. The process of claim 61 wherein the liquid so segregated contains at least 80% of at least one of said contaminants introduced into the turbine-condenser system.

65. The process of claim 58 wherein the said geothermal steam, prior to entry into said turbine of said turbine condenser system, has been pretreated by contact with an alkaline liquid.

66. The process of claim 65 wherein said alkaline liquid comprises ammonium hydroxide.

67. The process of claim 7, 8, 43, 48, or 56 wherein said geothermal steam entering said turbine contains ammonia, with at least 25% of the ammonia being captured in said liquid segregated in step (3).

68. The process of claim 7, 8, 44, or 58 wherein said geothermal steam entering said turbine contains ammonia, with at least 50% of the ammonia being captured in said liquid segregated in step (3).

69. The process of claim 7, 8, 45, 49, 54, or 61 wherein said geothermal steam entering said turbine contains ammonia, with at least 75% of the ammonia being captured in said liquid segregated in step (3).

70. The process of claim 51, 52, 56, or 64 wherein said geothermal steam introduced into said turbine contains boron in a concentration of at least 3 ppm by weight.

71. The process of claim 70 wherein a contaminant-lean fraction of total condensate is removed from the condenser of said turbine-condenser system, said contaminant-lean fraction having a boron content no greater than 0.75 mg/l.

72. The process of claim 35, 48, 50, 60, or 62 wherein said geothermal steam introduced into said turbine contains boron in a concentration of at least 4 ppm by weight or arsenic in a concentration of at least 0.5 ppm by weight.

73. The process of claim 72 wherein a contaminant-lean fraction of total condensate is removed from the condenser of said turbine-condenser system, said contaminant-lean fraction having a boron content no greater than 2 mg/l and an arsenic content below 0.10 mg/l.

74. The process of claim 37, 48, 53, 54, 60, or 61 wherein said geothermal steam introduced into said turbine contains boron in a concentration of at least 5 ppm by weight or arsenic in a concentration of at least 1 ppm by weight.

75. The process of claim 74 wherein a contaminant-lean fraction of total condensate is removed from the condenser of said turbine-condenser system, said contaminant-lean fraction having a boron content no greater than 2 mg/l.

76. The process of claim 75 wherein a contaminant-lean fraction of total condensate is removed from the condenser of said turbine-condenser system, said contaminant-lean fraction having a boron content no greater than 0.75 mg/l and an arsenic content below 0.10 mg/l.

77. The process of claim 34, 50, or 63 wherein said geothermal steam introduced into said turbine contains boron in a concentration of at least 6 ppm by weight or arsenic in a concentration of at least 0.25 ppm by weight.

78. The process of claim 77 wherein a contaminant-lean fraction of total condensate is removed from the condenser of said turbine-condenser system, said contaminant-lean fraction having a boron content no greater than 0.75 mg/l.

79. The process of claim 36, 42, 44, or 55 wherein said geothermal steam introduced into said turbine contains boron in a concentration of at least 7 ppm by weight or arsenic in a concentration of at least 0.5 ppm by weight.

80. The process of claim 79 wherein a contaminant-lean fraction of total condensate is removed from the condenser of said turbine-condenser system, said contaminant-lean fraction having a boron content no greater than 2 mg/l and an arsenic content below 0.10 mg/l.

81. The process of claim 38, 49, or 60 wherein said geothermal steam introduced into said turbine contains boron in a concentration of at least 8 ppm by weight or arsenic in a concentration of at least 0.75 ppm by weight.

82. The process of claim 81 wherein a contaminant-lean fraction of total condensate is removed from the condenser of said turbine-condenser system, said contaminant-lean fraction having a boron content no greater than 0.75 mg/l and an arsenic, content below 0.10 mg/l.

83. The process of claim 39, 47, or 63 wherein said geothermal steam introduced into said turbine contains boron in a concentration of at least 9 ppm by weight or arsenic in a concentration of at least 1.5 ppm by weight.

84. The process of claim 83 wherein a contaminant-lean fraction of total condensate is removed from the condenser of said turbine-condenser system, said contaminant-lean fraction having a boron content no greater than 2 mg/l.

85. The process of claim 41, 43, or 60 wherein said geothermal steam introduced into said turbine contains boron in a concentration of at least 10 ppm by weight or arsenic in a concentration of at least 2.0 ppm by weight.

86. The process of claim 85 wherein a contaminant-lean fraction of total condensate is removed from the condenser of said turbine-condenser system, said contaminant-lean fraction having a boron content no greater than 0.75 mg/l and an arsenic content below 0.10 mg/l.

87. The process of claim 33, 48, or 62 wherein said geothermal steam introduced into said turbine contains boron in a concentration of at least 11 ppm by weight or arsenic in a concentration of at least 2.5 ppm by weight.

88. The process of claim 87 wherein a contaminant-lean fraction of total condensate is removed from the condenser of said turbine-condenser system, said contaminant-lean fraction having a boron content no greater than 2 mg/l.

89. The process of claim 51, 60, or 61 wherein said geothermal steam introduced into said turbine contains boron in a concentration of at least 13 ppm by weight or arsenic in a concentration of at least 3 ppm by weight.

90. The process of claim 89 wherein a contaminant-lean fraction of total condensate is removed from the condenser of said turbine-condenser system, said contaminant-lean fraction having a boron content no greater than 0.75 mg/l and an arsenic content below 0.10 mg/l.

91. The process of claim 40, 49, or 62 wherein said geothermal steam introduced into said turbine contains boron in a concentration of at least 15 ppm by weight or arsenic in a concentration of at least 4 ppm by weight.

92. The process of claim 91 wherein a contaminant-lean fraction of total condensate is removed from the condenser of said turbine-condenser system, said contaminant-lean fraction having a boron content no greater than 2 mg/l.

93. The process of claim 56 or 60 wherein the liquid segregated in step (3) includes a contaminant-rich, early produced fraction of steam condensate separated from steam removed from the turbine-condenser system at a location upstream of the condenser, with the steam so removed, after separation from said steam condensate, being employed to power a steam ejector removing non-condensable gases from said condenser.

94. The process of claim 93 wherein said geothermal steam introduced into said turbine contains boron in a concentration of at least 3 ppm by weight or arsenic in a concentration of at least 0.5 ppm by weight.

95. The process of claim 94 wherein a contaminant-lean fraction of total condensate is removed from the condenser of said turbine-condenser system, said contaminant-lean fraction having a boron content no greater than 2 mg/l and an arsenic content below 0.10 mg/l.

96. The process of claim 94 wherein said geothermal steam entering said turbine contains ammonia, with more than 25% of the ammonia being captured in said liquid segregated in step (3).

97. The process of claim 96 wherein a contaminant-lean fraction of total condensate is removed from the condenser of said turbine-condenser system, said contaminant-lean fraction having a boron content no greater than 2 mg/l and an arsenic content below 0.10 mg/l.

98. The process of claim 51 or 61 wherein the liquid segregated in step (3) includes a contaminant-rich, early produced fraction of steam condensate separated from steam extracted from the turbine, with the steam so removed, after separation from said steam condensate, being employed to power a steam ejector removing non-condensable gases from said condenser.

99. The process of claim 98 wherein said geothermal steam introduced into said turbine contains boron in a concentration of at least 3 ppm by weight or arsenic in a concentration of at least 1 ppm by weight.

100. The process of claim 99 wherein said geothermal steam entering said turbine contains ammonia, with at least 50% of the ammonia being captured in said liquid segregated in step (3).

101. The process of claim 99 wherein a contaminant-lean fraction of total condensate is removed from the condenser of said turbine-condenser system, said contaminant-lean fraction having a boron content no greater than 2 mg/l and an arsenic content below 0.10 mg/l.

102. The process of claim 12 wherein (a) the geothermal steam introduced into the turbine in step (1) contains boron and (b) the total of steam condensate removed in step (2) contains more than 25% of the boron introduced into the turbine.

103. The process of claim 12 wherein (a) the geothermal steam introduced into the turbine in step (1) contains boron and (b) the total of steam condensate removed in step (2) contains at least 50% of the boron introduced into the turbine.

104. The process of claim 12 wherein (a) the geothermal steam introduced into the turbine in step (1) contains boron and (b) the total of steam condensate removed in step (2) contains at least 70% of the boron introduced into the turbine.

105. The process of claim 102, 103, or 104 wherein said geothermal steam introduced into said turbine contains boron in a concentration of at least 3 ppm by weight.

106. The process of claim 105 wherein said steam condensate removed in step (2) constitutes less than 25% of the total steam condensate produced in the turbine-condenser system.

107. The process of claim 12 wherein (a) the geothermal steam introduced into the turbine in step (1) contains arsenic and (b) the total of steam condensate removed in step (2) contains more than 25% of the arsenic introduced into the turbine.

108. The process of claim 12 wherein (a) the geothermal steam introduced into the turbine in step (1) contains arsenic and (b) the total of steam condensate removed in step (2) contains at least 50% of the arsenic introduced into the turbine.

109. The process of claim 12 wherein (a) the geothermal steam introduced into the turbine in step (1) contains arsenic and (b) the total of steam condensate removed in step (2) contains at least 70% of the arsenic introduced into the turbine.

110. The process of claim 107, 108, or 109 wherein said geothermal steam introduced into said turbine contains arsenic in a concentration of at least 1 ppm by weight.

111. The process of claim 110 wherein said steam condensate removed in step (2) constitutes less than 25% of the total steam condensate produced in the turbine-condenser system.

112. The process of claim 12, 56 or 58 wherein (a) the geothermal steam introduced into the turbine in step (1) contains mercury and (b) more than 25% of the mercury is removed in step (2).

113. The process of claim 12 or 44 wherein (a) the geothermal steam introduced into the turbine in step (1) contains mercury and (b) at least 50% of the mercury is removed in step (2).

114. The process of claim 12 or 49 wherein (a) the geothermal steam introduced into the turbine in step (1) contains mercury and (b) at least 70% of the mercury is removed in step (2).

115. A process comprising:

(1) introducing geothermal steam containing boron, arsenic, mercury, ammonia, or hydrogen sulfide into a turbine-condenser system in which the steam is passed serially through the turbine and condenser while producing steam condensate;

(2) removing steam condensate relatively rich in boron, arsenic, mercury, ammonia, or hydrogen sulfide from the system at one or more locations in the turbine-condenser system where more than 50% of the total steam condensate has yet to be produced, said removed steam condensate including at least some steam condensate recovered after the final stage of said turbine; and (3) preventing at least some of said steam condensate removed in step (2) from contacting steam and condensate in the condenser of said turbine-condenser system.

116. The process of claim 115 wherein (a) the geothermal steam introduced into the turbine in step (1) contains ammonia and (b) at least 25% of the ammonia is removed in step (2) in the removed steam condensate.

117. The process of claim 115 wherein (a) the geothermal steam introduced into the turbine in step (1) contains ammonia and (b) at least 50% of the ammonia is removed in step (2) in the removed steam condensate.

118. The process of claim 115 wherein (a) the geothermal steam introduced into the turbine in step (1) contains ammonia and (b) at least 75% of the ammonia is removed in step (2) in the removed steam condensate.

119. A process as defined in claim 28 wherein said remainder constitutes a greater percentage of the total condensate than the first liquid condensate removed from said condensing zone in step (2).

120. A process as defined in claim 28 wherein said remainder constitutes more than twice the percentage of total condensate than the first liquid condensate removed in step (2).

121. The process of claim 27, 28, 30, 32, or 120 wherein said geothermal steam contains boron, and said first liquid condensate produced in step (1) contains boron in a concentration such that said remaining steam is of reduced boron content.

122. The process of claim 27, 29, 31, or 119 wherein said geothermal steam contains arsenic, and said first liquid condensate produced in step (1) contains arsenic in a concentration such that said remaining steam is of reduced arsenic content.

123. The process of claim 7, 10, 33, 43, 48, 54, or 58 wherein at least some of said liquid segregated in step (3) is injected into the earth.

124. The process of claim 76 wherein at least some of said liquid segregated in step (3) is injected into the earth.

* * * * *

UNITED STATES PATENT AND TRADEMARK OFFICE
CERTIFICATE OF CORRECTION

PATENT NO.    : 6,223,535 B1  
DATED         : May 1, 2001  
INVENTOR(S)   : Kevin R. Kitz It is certified that error appears in the above-identified patent and that said Letters Patent is hereby corrected as shown below:

Column 19,  
Line 27, after "not only" cancel "to" and insert in place thereof -- in providing --;  
Line 27, between "water" and "plants" insert -- to the --.

Column 23,  
Line 38, cancel "herein" and insert in place thereof -- wherein --.

Column 25,  
Line 42, after "arsenic" and before "content" cancel ",".

Signed and Sealed this

Fourteenth Day of October, 2003

JAMES E. ROGAN  
*Director of the United States Patent and Trademark Office*